US010185745B2

(12) United States Patent
Barsness et al.

(10) Patent No.: US 10,185,745 B2
(45) Date of Patent: *Jan. 22, 2019

(54) MANAGING A STREAM COMPUTING ENVIRONMENT USING A PROJECTED DATABASE OBJECT

(71) Applicant: International Business Machines Corporation, Armonk, NY (US)

(72) Inventors: Eric L. Barsness, Pine Island, MN (US); Daniel E. Beuch, Rochester, MN (US); Alexander Cook, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/461,164

(22) Filed: Mar. 16, 2017

(65) Prior Publication Data

US 2018/0268031 A1  Sep. 20, 2018

(51) Int. Cl.
*G06F 7/00* (2006.01)
*G06F 17/30* (2006.01)

(52) U.S. Cl.
CPC .. *G06F 17/30516* (2013.01); *G06F 17/30289* (2013.01); *G06F 17/30867* (2013.01)

(58) Field of Classification Search
CPC .................. G06F 17/30516; G06F 17/30306
See application file for complete search history.

(56) References Cited

U.S. PATENT DOCUMENTS

| 6,502,089 B1 | 12/2002 | Amundsen et al. |
| 6,564,204 B1 | 5/2003 | Amundsen et al. |
| 7,233,944 B2 | 6/2007 | Ahmed |
| 8,880,510 B2 | 11/2014 | Fricke et al. |
| 9,654,546 B1 | 5/2017 | Narsude et al. |
| 2007/0073421 A1 | 3/2007 | Adra |
| 2007/0240190 A1 | 10/2007 | Arseneau et al. |
| 2007/0288459 A1 | 12/2007 | Kashiyama et al. |
| 2007/0294216 A1 | 12/2007 | Aggarwal |
| 2012/0179809 A1 | 7/2012 | Barsness et al. |

(Continued)

OTHER PUBLICATIONS

List of IBM Patents or Patent Applications Treated as Related dated Mar. 16, 2017, 2 pp.

(Continued)

*Primary Examiner* — Marc S Somers
(74) *Attorney, Agent, or Firm* — Edward J. Wixted, III

(57) ABSTRACT

Disclosed aspects relate to managing a stream computing environment using a projected database object. A set of realized data of a realized database object of a database management system (DBMS) may be compared with a set of projected data of a projected database object of the DBMS. The set of realized data of the realized database object and the set of projected data of the projected database object may be compared with respect to the DBMS that relates to the stream computing environment. An outlier subset of the set of projected data may be identified based on comparing the set of realized data with the set of projected data. Based on the outlier subset of the set of projected data, an outlier response action may be executed in the stream computing environment.

18 Claims, 16 Drawing Sheets

(56) References Cited

U.S. PATENT DOCUMENTS

| | | | |
|---|---|---|---|
| 2015/0081879 A1* | 3/2015 | Branson | H04L 49/9084 709/224 |
| 2015/0295796 A1 | 10/2015 | Hsiao et al. | |
| 2016/0005128 A1 | 1/2016 | White et al. | |
| 2016/0048565 A1 | 2/2016 | Cammert et al. | |
| 2016/0070745 A1 | 3/2016 | Bender et al. | |
| 2016/0224688 A1 | 8/2016 | Baranczyk et al. | |
| 2016/0302096 A1 | 10/2016 | Chari et al. | |
| 2017/0026713 A1 | 1/2017 | Yin et al. | |

OTHER PUBLICATIONS

Barsness et al., "Managing a Database Management System Using a Set of Stream Computing Data", U.S. Appl. No. 15/461,140, filed Mar. 16, 2017, 112 pages.

Barsness et al., "Managing a Stream Computing Environment Using a Projected Database Object", U.S. Appl. No. 15/800,414, filed Nov. 1, 2017, 112 pages.

Barsness et al., "Managing a Stream Computing Environment Using a Projected Database Object", U.S. Appl. No. 15/800,454, filed Nov. 1, 2017, 112 pages.

IBM "List of IBM Patent Applications Treated as Related", Appendix P, dated Oct. 31, 2017, 2 pages.

Disclosed Anonymously; "Processing of streaming data in relational databases"; IP.com; Mar. 27, 2015. 7 pp.

Barsness et al., "Managing a Database Management System Using a Set of Stream Computing Data", U.S. Appl. No. 15/954,654, filed Apr. 17, 2018, 112 pages.

Barsness et al., "Managing a Database Management System Using a Set of Stream Computing Data", U.S. Appl. No. 15/954,684, filed Apr. 17, 2018, 112 pages.

Disclosed Anonymously; "Processing of streaming data in relational databases"; Prior Art Database Technical Disclosure, IP.com No. IPCOM000241113D; Mar. 27, 2015, 7 pages.

IBM, "List of Patent Applications Treated as Related", Appendix P, dated May 1, 2018, 2 pages.

* cited by examiner

MANAGING A STREAM COMPUTING ENVIRONMENT USING A PROJECTED DATABASE OBJECT

BACKGROUND

This disclosure relates generally to computer systems and, more particularly, relates to managing a stream computing environment using a projected database object. The amount of data that needs to be managed is increasing. Management of data may be desired to be performed as efficiently as possible. As data needing to be managed increases, the need for managing a stream computing environment using a projected database object may increase.

SUMMARY

Aspects of the disclosure relate to managing a stream computing environment using a projected database object. A projected database object may be used in relation to a realized database object to determine stream computing data that is not represented in the realized database object. Based on an examination of the projected database object with respect to the realized database object, an operation may be determined and performed with respect to the stream computing environment to facilitate performance of the stream computing environment. For instance, tuples may be filtered, traced, processed with a lower priority, processed using more or less robust code, routed down an alternate execution path, or the like.

Disclosed aspects relate to managing a stream computing environment using a projected database object. A set of realized data of a realized database object of a database management system (DBMS) may be compared with a set of projected data of a projected database object of the DBMS. The set of realized data of the realized database object and the set of projected data of the projected database object may be compared with respect to the DBMS that relates to the stream computing environment. An outlier subset of the set of projected data may be identified based on comparing the set of realized data with the set of projected data. Based on the outlier subset of the set of projected data, an outlier response action may be executed in the stream computing environment.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
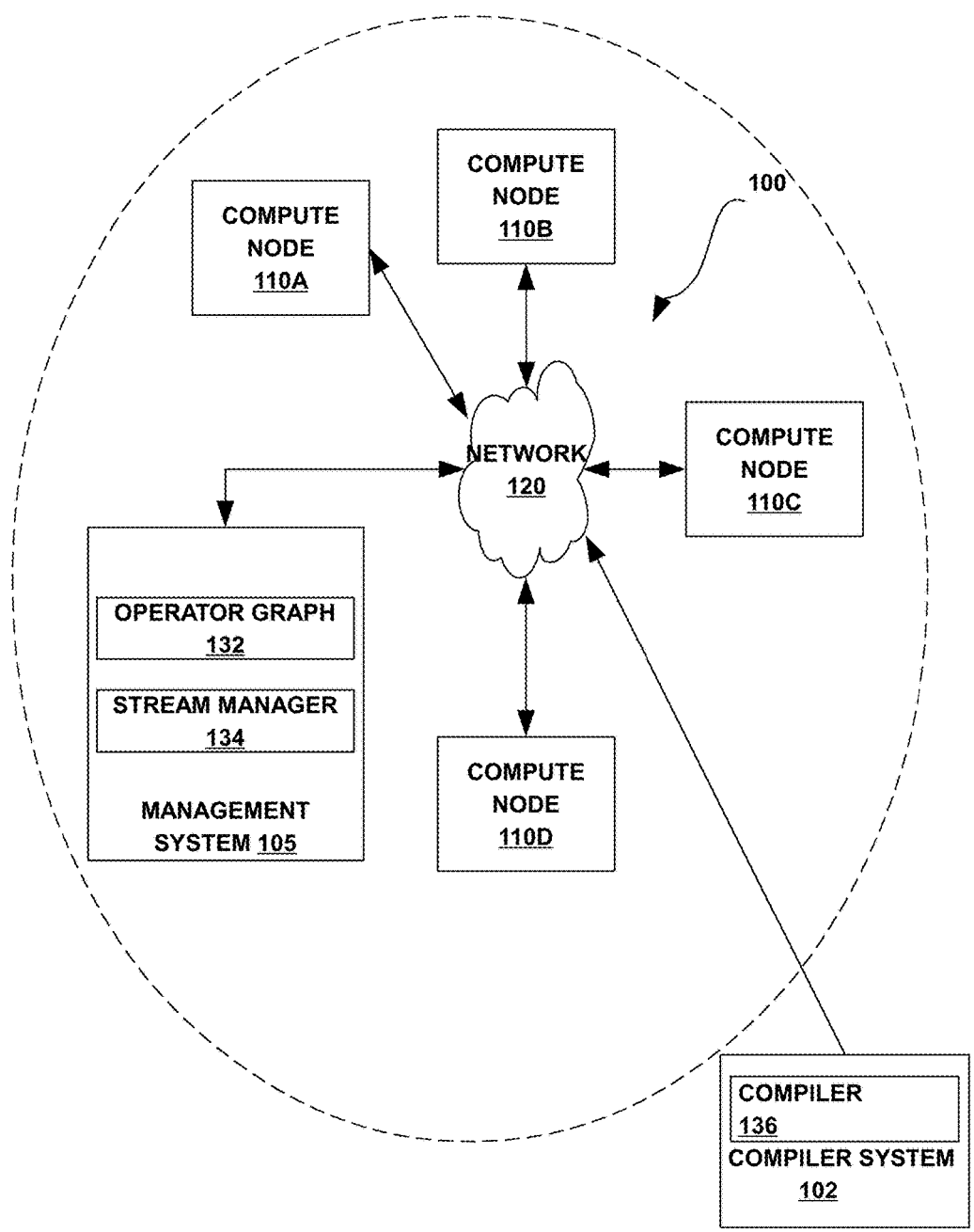
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to managing a stream computing environment using a projected database object. A projected database object (e.g., preview of an anticipated state of a database) may be used in relation to a realized database object (e.g., actual state of the current database) to determine stream computing data that is not represented in the realized database object (e.g., data may be filtered out, not intended to be stored in a database, corrupt, be structured in an unsupported format). Based on an examination of the projected database object with respect to the realized database object, an operation may be determined and performed with respect to the stream computing environment to facilitate performance of the stream computing environment. For instance, tuples may be filtered, traced, processed with a lower priority, processed using more or less robust code, routed down an alternate execution path, or the like. Leveraging the projected database object of a database management system (DBMS) with respect to a stream computing environment may be associated with benefits including data throughput performance, reduced data congestion, and resource usage efficiency.

Database management systems and stream computing environments may be used in conjunction with one another to facilitate data transmission and organizational operations. Aspects of the disclosure relate to the recognition that, in some situations, database management operations may be performed reactively in response to receiving data from a streaming environment, limiting the ability of the DBMS to prepare for incoming data. Accordingly, aspects of the disclosure relate to using a set of stream computing environment statistics to determine a proactive database management operation for performance with respect to the DBMS in advance of receiving data from the streaming environment (e.g., to prepare the DBMS prior to data delivery). As such, database management operations may be performed in an efficient manner based on the amount and nature of incoming stream computing environment data.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure relate to a system, method, and computer program product for managing a database management system (DBMS) using a set of stream computing data derived from a stream computing environment. The set of stream computing data which indicates a set of stream computing environment statistics may be collected with respect to the stream computing environment. A proactive database management operation may be determined for performance with respect to the DBMS based on the set of stream computing data which indicates the set of stream computing environment statistics. The proactive database management operation may be performed to manage the DBMS using the set of stream computing data.

Aspects of the disclosure relate to analyzing the set of stream computing data which indicates the set of stream computing environment statistics, resolving an anticipated database management operation with respect to the DBMS based on the set of stream computing data, and determining the proactive database management operation in correlation with the anticipated database management operation. In embodiments, a projected database object with respect to the DBMS may be built, updated, or removed based on the set of stream computing data which indicates the set of stream computing environment statistics. In embodiments, a database object with respect to the DBMS may be built, updated, or removed based on the set of stream computing data which indicates the set of stream computing environment statistics. In embodiments, it may be determined to bypass an expected database management operation with respect to the DBMS for at least a temporal period, and the expected database management operation may be bypassed for at least the temporal period to manage the DBMS using the set of stream computing data. In embodiments, it may be determined to expedite an expected database management operation with respect to the DBMS, and the expected database management operation may be expedited and performed with respect to the DBMS. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

Aspects of the disclosure relate to managing a stream computing environment using a projected database object. A set of realized data of a realized database object of the DBMS may be compared with a set of projected data of a projected database object of the DBMS. Based on comparing the set of realized data of the realized database object with the set of projected data of the projected database object, an outlier subset of the set of projected data of the projected database object may be identified. An outlier response operation may be executed in the stream computing environment based on the outlier subset of the set of projected data of the projected database object.

In embodiments, it may be ascertained that the stream computing environment includes a set of outlier tuples based on the outlier subset of the set of projected data of the projected database object. In embodiments, the outlier response operation may be determined for execution in the stream computing environment based on the outlier subset of the set of projected data of the projected database object. In embodiments, the outlier response operation may be structured to include one or more of a filtering operation, a prioritization-downgrade operation, a marking operation, a tracing operation, a code robustness operation, a routing operation, a performance collection operation, an ancillary action prevention operation, or a projection prevention operation. The outlier subset of the set of projected data of the projected database object may be correlated with a set of outlier tuples of the stream computing environment, and the outlier response operation may be executed in the stream computing environment. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

Turning now to the Figures, FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
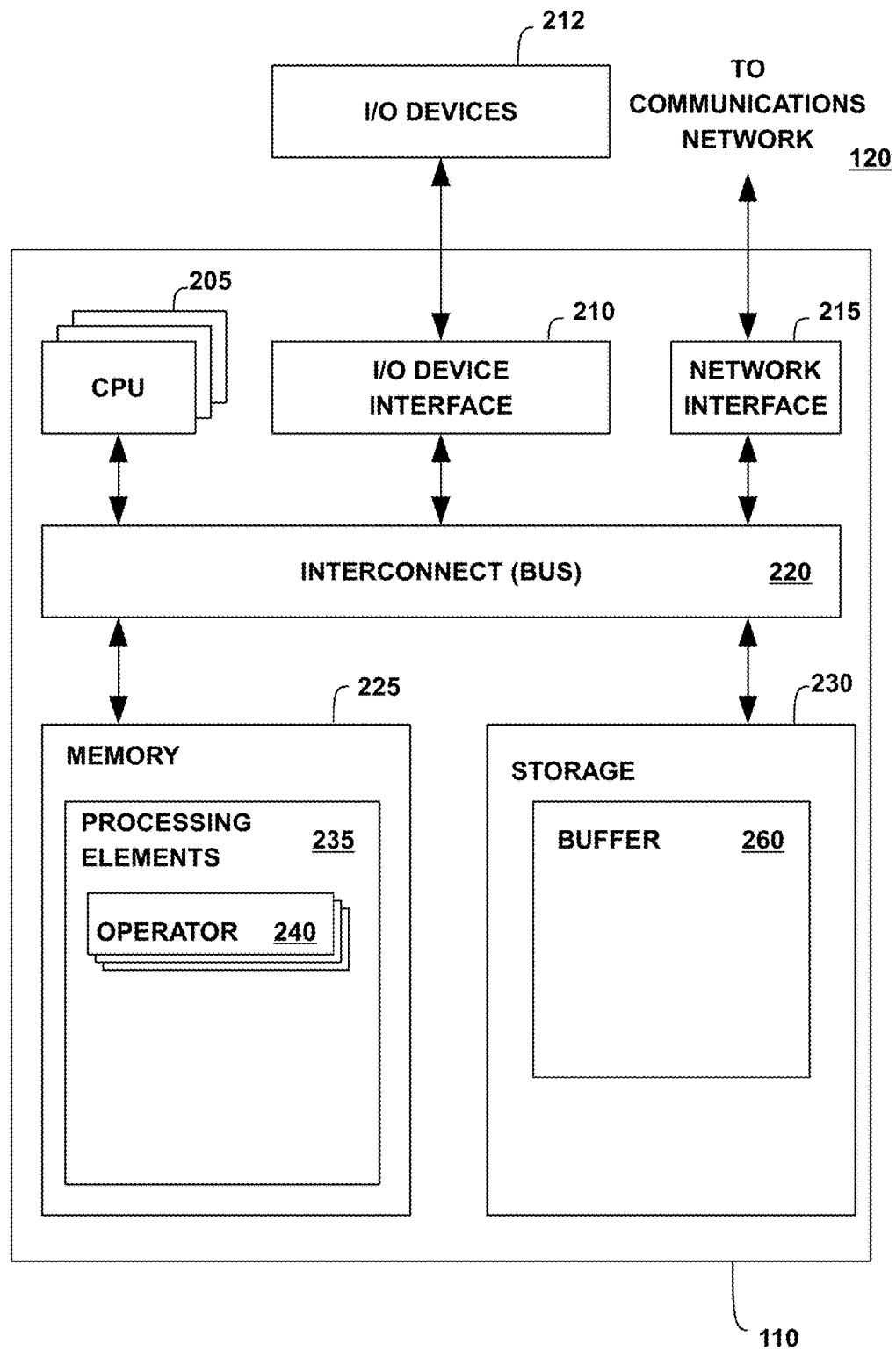
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
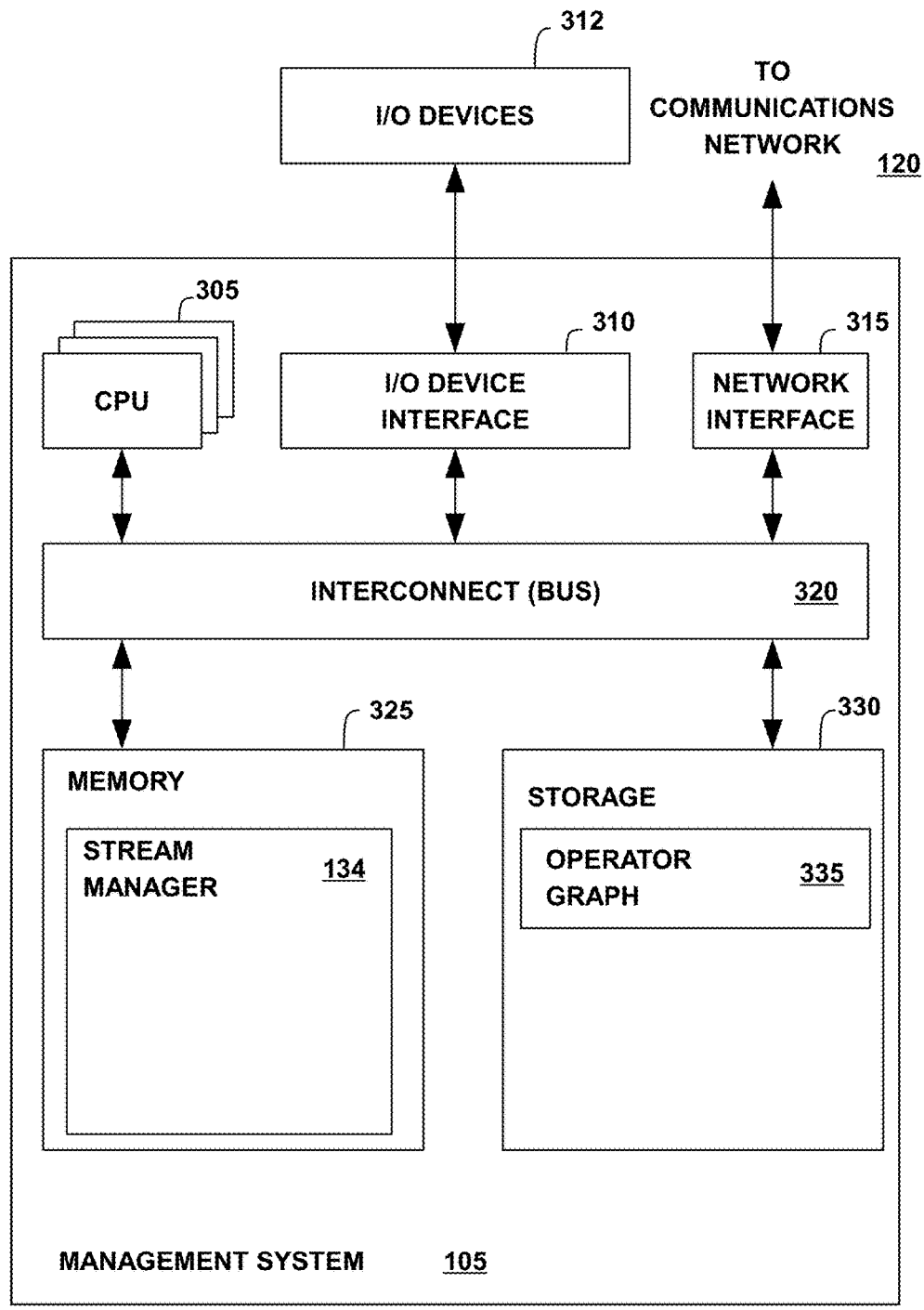
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
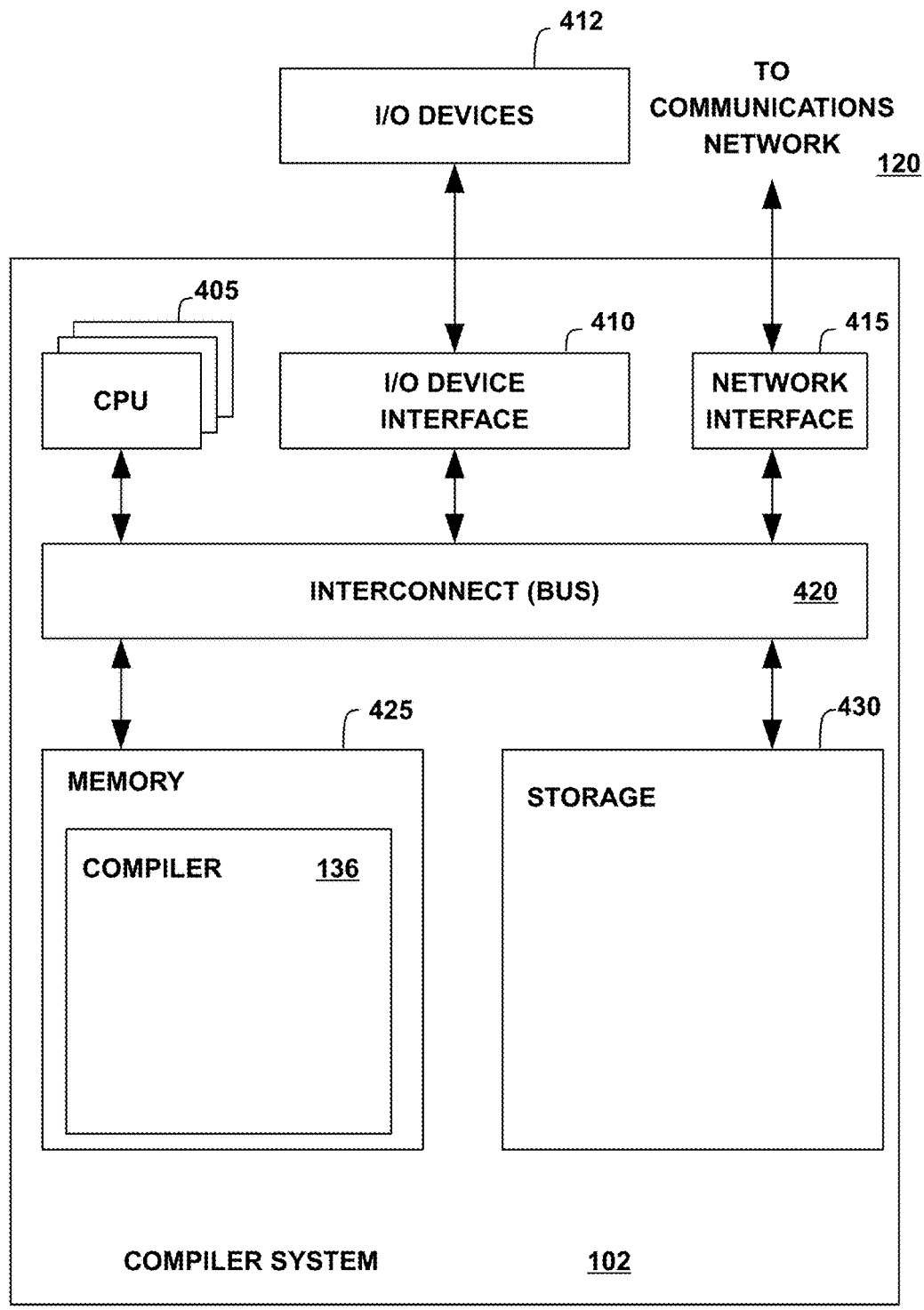
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In embodiments, a streams application bundle or streams application bundle file may be created. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute processes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
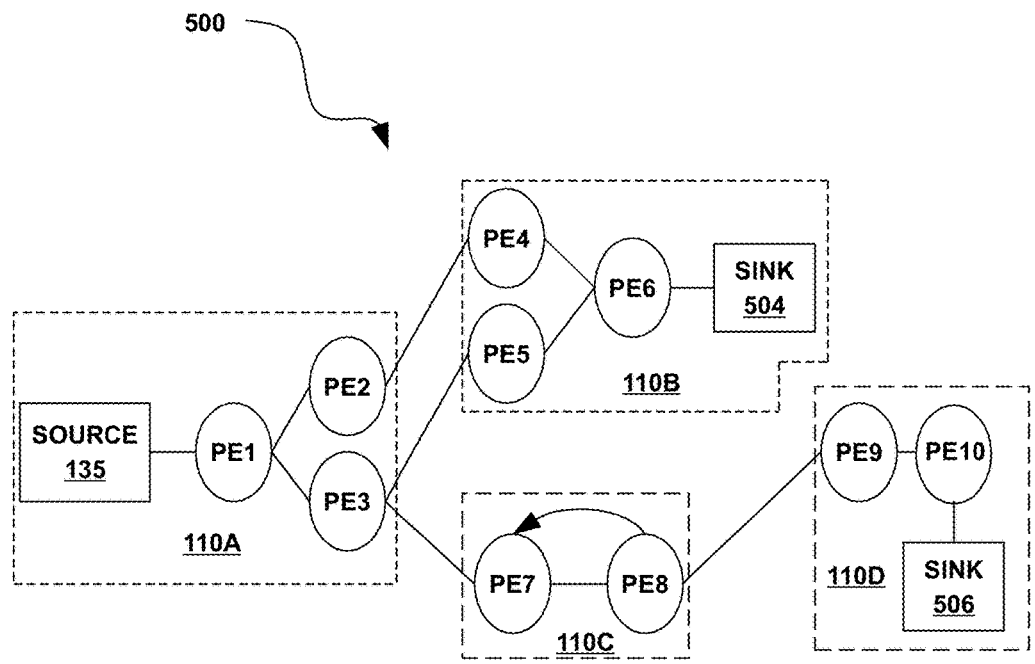
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML, documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
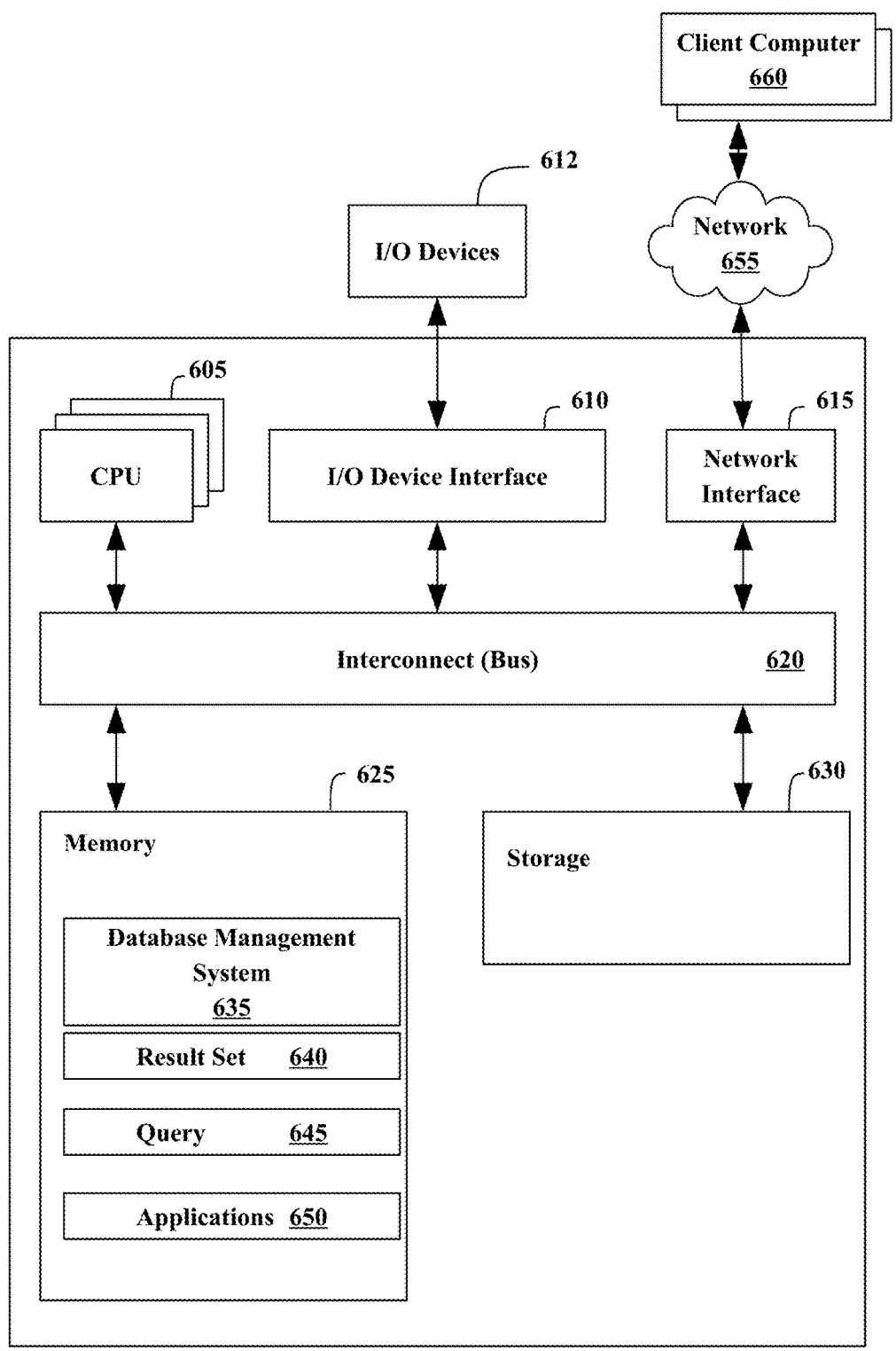
FIG. 6 illustrates an example representation of a computer system connected to a client computer via a network according to an embodiment.

FIG. 6 illustrates an example representation of a computer system 600 connected to one or more client computers 660 via a network 655, according to some embodiments. For the purposes of this disclosure, computer system 600 may represent practically any type of computer, computer system, or other programmable electronic device, including but not limited to, a client computer, a server computer, a portable computer, a handheld computer, an embedded controller, etc. In some embodiments, computer system 600 may be implemented using one or more networked computers, e.g., in a cluster or other distributed computing system.

The computer system 600 may include, without limitation, one or more processors (CPUs) 605, a network interface 615, an interconnect 620, a memory 625, and a storage 630. The computer system 600 may also include an I/O device interface 610 used to connect I/O devices 612, e.g., keyboard, display, and mouse devices, to the computer system 600.

Each processor 605 may retrieve and execute programming instructions stored in the memory 625 or storage 630. Similarly, the processor 605 may store and retrieve application data residing in the memory 625. The interconnect 620 may transmit programming instructions and application data between each processor 605, I/O device interface 610, network interface 615, memory 625, and storage 630. The interconnect 620 may be one or more busses. The processor 605 may be a single central processing unit (CPU), multiple CPUs, or a single CPU having multiple processing cores in various embodiments. In one embodiment, a processor 605 may be a digital signal processor (DSP).

The memory 625 may be representative of a random access memory, e.g., Static Random Access Memory (SRAM), Dynamic Random Access Memory (DRAM), read-only memory, or flash memory. The storage 630 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 615 may be configured to transmit data via the communications network 655.

The memory 625 may include a database management system (DBMS) 635, a result set 640, a query 645, and applications 650. Although these elements are illustrated as residing in the memory 625, any of the elements, or combinations thereof, may reside in the storage 630 or partially in the memory 625 and partially in the storage 630. Each of these elements will be described in greater detail in accordance with FIG. 7.

The network 655 may be any suitable network or combination of networks and may support any appropriate protocol suitable for communication of data and/or code to/from the server computer system 600 and the client computer system 660. In some embodiments, the network 655 may support wireless communications. In other embodiments, the network 655 may support hardwired communications. The network 655 may be the Internet and may support Internet Protocol in some embodiments. In other embodiments, the network 655 may be implemented as a local area network (LAN) or a wide area network (WAN). The network 655 may also be implemented as a cellular data network. Although the network 655 is shown as a single network in the figures, one or more networks of the same or different types may be included.

The client computer system 660 may include some or all of the hardware and software elements of the computer system 600 previously described. As shown, there may be one or more client computers 660 connected to the computer system 600 via the network 655. In some embodiments, one or more client computers 660 may send a query 645 by network 655 to computer system 600 and receive a result set 640.

Figure 7:
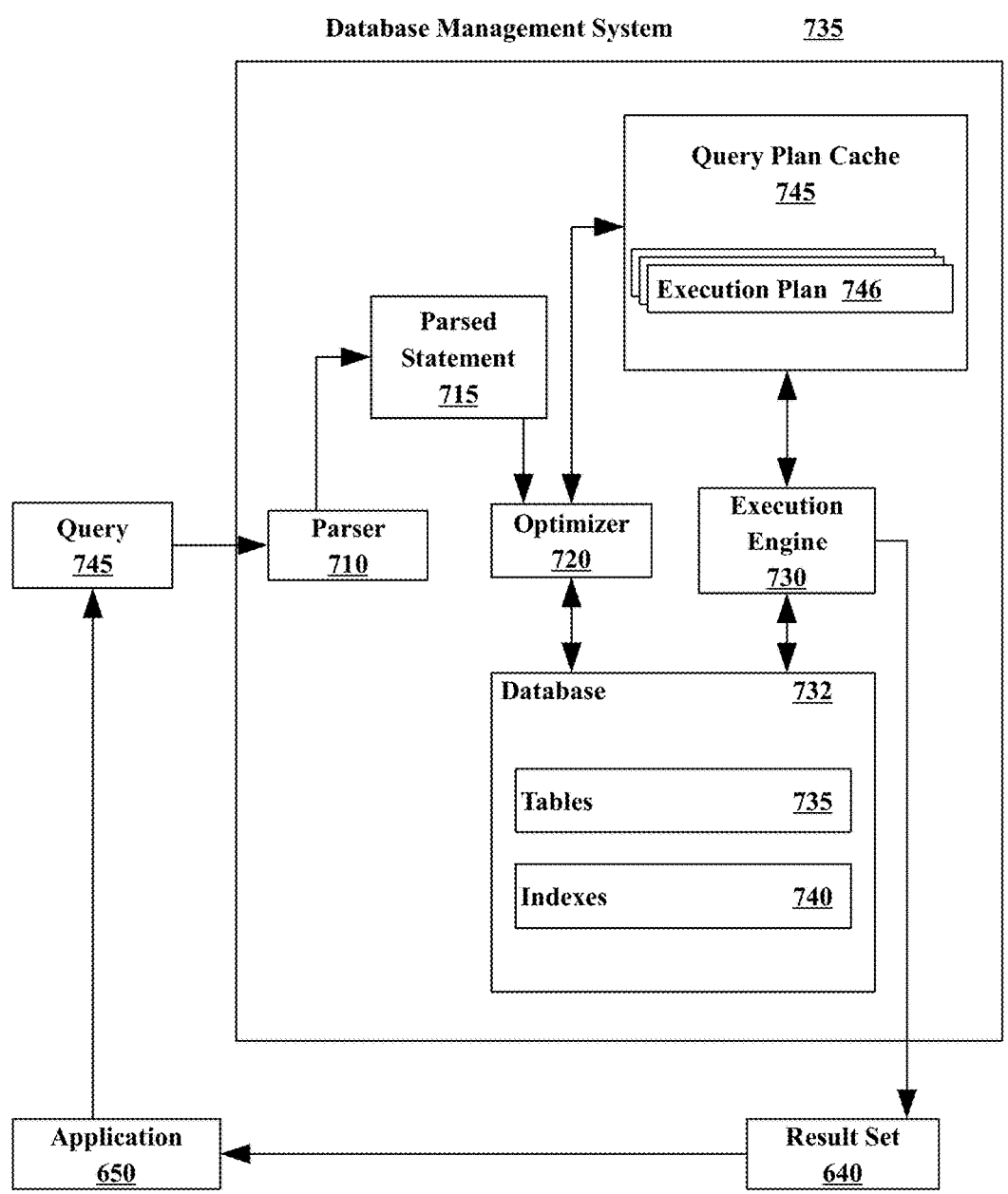
FIG. 7 illustrates an example database management system (DBMS) according to an embodiment.

FIG. 7 illustrates an example database management system (DBMS) 635. The DBMS 635 may include a parser 710, an optimizer 720, an execution engine 730, and a database 732. The parser 710 may receive a database query 645 from an application 650. In some embodiments, the database query 645 may be in the form of a Structured Query Language (SQL) statement. The parser 710 may generate a parsed statement 715. The parser 710 may send the parsed statement 715 to an optimizer 720. The optimizer 720 may attempt to optimize the parsed statement. In some embodiments, optimizing may improve the performance of the database query 645 by, for example, reducing the amount of time it takes to provide a user with a response. The optimizer 720 may generate an execution plan 746 (access plan), which may be maintained in a query plan cache 745, according to some embodiments. The query plan cache 745 may include one or more execution plans 746, including the current execution plan as well as previously used execution plans. Once an execution plan 746 is generated, the execution plan 746 may be sent to the execution engine 730. The execution engine 730 may execute the query 645. Executing the query 745 may include finding and retrieving data in the database tables 735 that satisfies the criteria supplied in the query 645. The execution engine 730 may store the data returned matching the query 645 in a result set 640. The DBMS 635 may return the result set 640 to an application 650, such as the application in which the database query 645 was generated, as a response to the database query 645.

A database 732 may include one or more tables 735 and, in some embodiments, one or more indexes 740. A database table 735 may organize data into rows and columns. Each row of a database table 735 may correspond to an individual entry, a tuple, or a record in the database 732. A column may define what is stored in each entry, tuple, or record. In some embodiments, columns of a table 735 may also be referred to as fields or attributes. Each table 735 within the database 732 may have a unique name. Each column within a table 735 may also have a unique name. A row, tuple, or record, however, within a particular table 735 may not be unique, according to some embodiments. A database 732 may also include one or more indexes 740. An index 740 may be a data structure that may inform the DBMS 635 of the location of a particular record within a table 735 if given a particular indexed column value. In some embodiments, the execution engine 730 may use the one or more indexes 740 to locate data within a table 735. In other embodiments, the execution engine 730 may scan the tables 735 without using an index 740.

As mentioned herein, the optimizer 720 creates the query access plan. The optimizer 720 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 8:
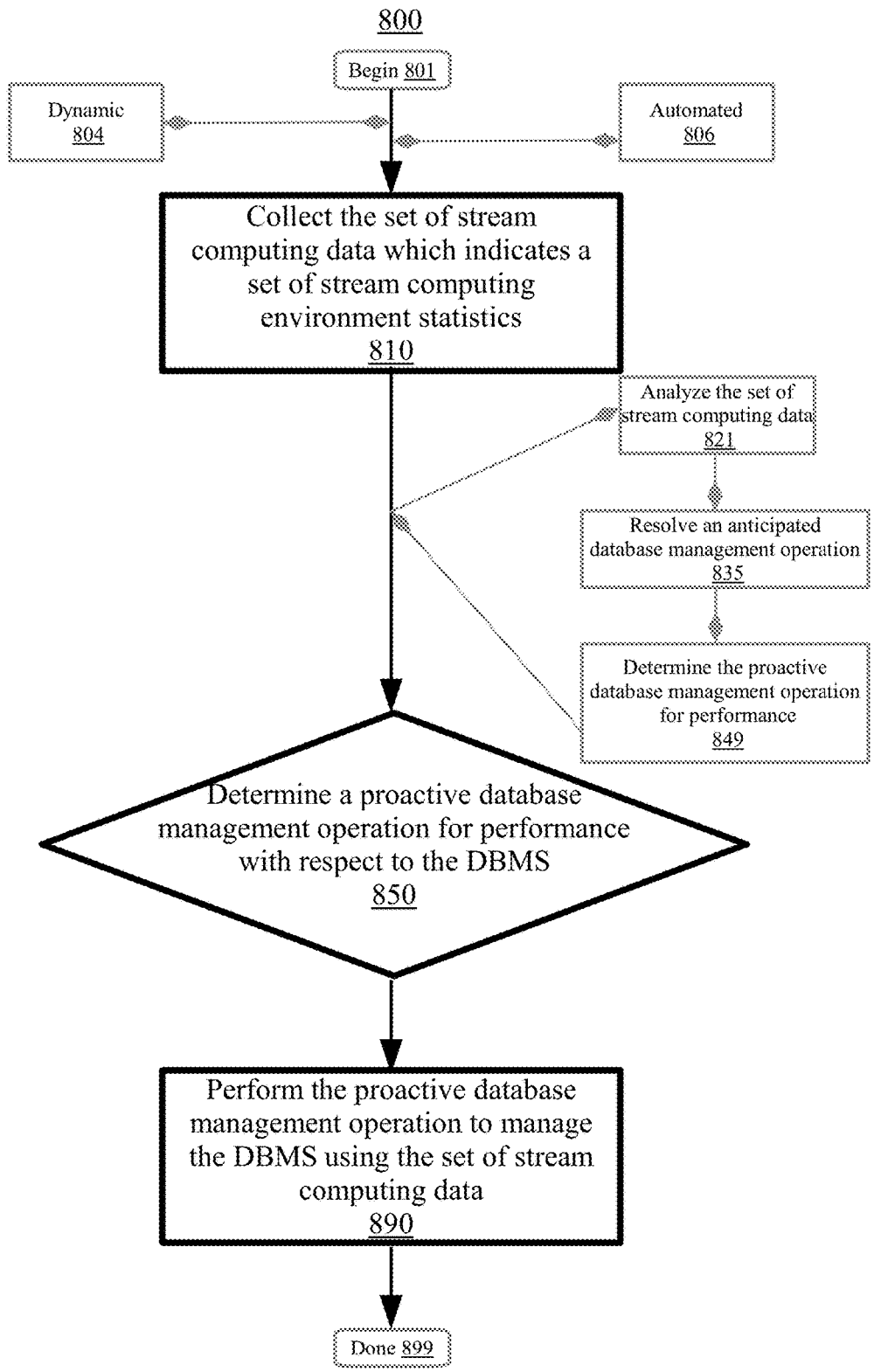
FIG. 8 is a flowchart illustrating a method for managing a DBMS using a set of stream computing data derived from a stream computing environment, according to embodiments.

FIG. 8 is a flowchart illustrating a method 800 for managing a DBMS using a set of stream computing data derived from a stream computing environment. Aspects of method 800 relate to determining and performing a proactive database management operation to manage the DBMS using a set of collected stream computing data which indicates a set of stream computing environment statistics. Aspects of the disclosure relate to the recognition that, in some situations, database management operations may be performed reactively in response to receiving data from a streaming environment, limiting the ability of the DBMS to prepare for incoming data. Accordingly, aspects of the disclosure relate to using a set of stream computing environment statistics to determine a proactive database management operation for performance with respect to the DBMS in advance of receiving data from the streaming environment (e.g., to prepare the DBMS prior to data delivery). Leveraging stream statistics with respect to a database management system may be associated with benefits including database operation performance, resource utilization, and database management efficiency. The method 800 may begin at block 801.

In embodiments, the collecting, the determining, the performing, and the other steps described herein may each be executed in a dynamic fashion at block 804. The steps described herein may be executed in a dynamic fashion to streamline management of the DBMS using the set of stream computing data. For instance, the collecting, the determining, the performing, and the other steps described herein may occur in real-time, ongoing, or on-the-fly. As an example, one or more steps described herein may be performed on-the-fly (e.g., the proactive database management operation may be determined and performed in real-time based on the collected set of stream computing data) in order to streamline (e.g., facilitate, promote, enhance) management of the DBMS. Other methods of performing the steps described herein are also possible.

In embodiments, the collecting, the determining, the performing, and the other steps described herein may each be executed in an automated fashion at block 806. The steps described herein may be executed in an automatic fashion without user intervention. In embodiments, the collecting, the determining, the performing, and the other steps described herein may be carried out by an internal DBMS management module maintained in a persistent storage device of a local computing device (e.g., network node). In embodiments, the collecting, the determining, the performing, and the other steps described herein may be carried out by an external DBMS management module hosted by a remote computing device or server (e.g., server accessible via a subscription, usage-based, or other service model). In this way, aspects of DBMS management may be performed using automated computing machinery without manual action. Other methods of performing the steps described herein are also possible.

At block 810, the set of stream computing data may be collected. The collecting may occur with respect to the stream computing environment. The set of stream computing data may indicate a set of stream computing environment statistics. Generally, collecting can include gathering, detecting, accumulating, capturing, sensing, aggregating, or otherwise acquiring or obtaining the set of stream computing data. The set of stream computing data may include information related to the physical or logical topology of the stream computing environment (e.g., host node configurations, operator graph branches/channels), the type or amount of network data traffic (e.g., tuples) handled by the stream computing environment, stream operator attributes (e.g., functions, operator types), or other information that characterizes the stream computing environment. The set of stream computing data may indicate a set of stream computing environment statistics. The set of stream computing environment statistics may include data or information derived from (e.g., arising out of) the set of stream computing data that provides a quantitative indication of one or more aspects of the stream computing environment. As examples, the set of stream computing environment statistics may include a calculated or estimated amount of incoming data traffic (e.g., 300 megabytes of tuples), stream operator tuple throughput rates (e.g., 500 tuples per second), stream computing environment congestion rates (e.g., buildup at stream operator A, 15% congestion in the operator graph), or the like. In embodiments, collecting the set of stream computing data may include using a streams management engine to monitor the operational behavior of the stream operators and processing elements over a period of time to aggregate the set of stream computing environment statistics. For instance, the streams management engine may track the data flow patterns and stream computing resource usage for a 72 hour time period, and record average tuple throughput rates, congestion rate fluctuations, and data traffic amounts as a function of time. Other methods of collecting the set of stream computing data with respect to the stream computing environment are also possible.

In embodiments, the set of stream computing data may be analyzed at block 821. The set of stream computing data may indicate the set of stream computing environment statistics. Generally, analyzing can include evaluating the set of stream computing data to determine one or more properties, attributes, or characteristics (e.g., amount of incoming data traffic, tuple throughput rates, number of stream operators) of the stream computing environment. Analyzing can include examining (e.g., performing an inspection of the set of stream computing data), evaluating (e.g., generating an appraisal of the set of stream computing data), resolving (e.g., ascertaining an observation/conclusion/answer with respect to the set of stream computing data), parsing (e.g., deciphering structured and unstructured data constructs of the set of stream computing data), querying (e.g., asking a question regarding the set of stream computing data) or categorizing (e.g., organizing by a feature or element of the set of stream computing data). Data analysis may include a process of inspecting, cleaning, transforming, or modeling data to discover useful information, suggest conclusions, or support decisions. Data analysis can extract information/patterns from a data set and transform/translate it into an understandable structure for further use. As an example, analyzing may include identifying tuple flow patterns within the stream computing environment to calculate an expected or anticipated traffic volume that will be delivered to the DBMS. As another example, analyzing may include ascertaining a database resource usage profile (e.g., summary of the database resources and required database operations) for a forecasted set of tuples. Other methods of analyzing the set of stream computing data are also possible.

In embodiments, an anticipated database management operation may be resolved at block 835. The resolving may occur based on the set of stream computing data. The anticipated database management operation may be resolved with respect to the DBMS. Generally, resolving can include predicting, formulating, forecasting, identifying, or otherwise ascertaining the anticipated database management operation with respect to the DBMS. The anticipated database management operation may include an action, process, procedure, or other activity that is expected to be performed in the DBMS in response to arrival of a forecasted set of tuples from the stream computing environment. In embodiments, resolving the anticipated database management operation may include detecting a database resource usage profile for a forecasted set of tuples, referencing a log of historical database management operations, and ascertaining a database management operation from the log that was used in the past with respect to a set of tuples having a database resource usage profile that achieves a similarity threshold with respect to the forecasted set of tuples (e.g., database management operations that have been used in the past to effectively manage similar sets of tuples). In embodiments, resolving the anticipated database management operation may include consulting a set of database response action rules (e.g., guidelines, directives, commands for how to manage particular sets of tuples), and determining an anticipated database management operation that is designated as being associated with positive impacts with respect to sets of tuples having a given database resource usage profile. As an example, in response to detecting that a database resource usage profile for a forecasted set of tuples indicates that the forecasted set of tuples is expected to occupy a total of 4000 data cells in the DBMS, the database resource usage profile may be compared to a set of database response action rules that indicate that, for sets of tuples expected to use more than 3500 data cells, generation of a separate index may be associated with efficient operation processing. Accordingly, an anticipated database management operation of generating a separate index may be resolved. Other methods of resolving the anticipated database management operation are also possible.

In embodiments, a proactive database management operation in correlation with the anticipated database management operation may be determined at block 849. The determining may occur based on the anticipated database management operation with respect to the DBMS. Generally, determining can include formulating, resolving, computing, calculating, identifying, or otherwise ascertaining the proactive database management operation based on the anticipated database management operation with respect to the DBMS. In embodiments, the proactive database management operation may include an action that substantially corresponds to the anticipated database management operation (e.g., implements the same function as the anticipated database management operation). In embodiments, the proactive database response action may include an action that performs a substantially different operation than the anticipated database management operation, and mitigates (e.g., deters) the need for the anticipated database management operation. As an example, the anticipated database management operation may recommend updating an existing index, whereas the proactive database management table may recommend creating an additional index (e.g., creating a new index may eliminate the need to update an existing index). In embodiments, the proactive database management operation may include an action that is performed in addition to the anticipated database management operation (e.g., in conjunction with the anticipated database management operation). For instance, the proactive database management operation may be performed in advance of, simultaneously with, or after the anticipated database management operation. In certain embodiments, the proactive database management operation may include an action configured to supersede, fulfill, preempt, supplant, take the place of, or otherwise replace the anticipated database management operation (e.g., an existing data table may be updated and reformatted rather than removed). In embodiments, determining the anticipated database management operation may include simulating performance of the anticipated database management operation (e.g., in a projected database), evaluating the result of the anticipated database management operation with respect to managing a forecasted set of tuples, and ascertaining a database management operation based on the result (e.g., if the anticipated database management operation was sufficient to manage the forecasted set of tuples it may be utilized with no change, whereas if the anticipated database management operation was insufficient to manage the forecasted set of tuples, a replacement/additional/supplementary action may be determined as the proactive database management operation). Other methods of determining the proactive database management operation based on the anticipated database management operation with respect to the DBMS are also possible.

At block 850, a proactive database management operation may be determined. The determining may occur based on the set of stream computing data which indicates the set of stream computing environment statistics. The proactive database management operation may be determined for performance with respect to the DBMS. Generally, determining can include formulating, resolving, computing, calculating, identifying, or otherwise ascertaining the proactive database management operation based on the set of stream computing data which indicates the set of stream computing environment statistics. The proactive database management operation may include an action, process, procedure, or other activity configured to modify one or more data structures within the DBMS (e.g., to prepare the DBMS for arrival of data from the stream computing environment). The proactive database management operation may be an anticipatory action determined based on predictive analysis (e.g., forecasted, expected stream behavior) of the set of stream computing data in advance of prompting by the stream computing environment. As examples, the proactive database management operation may include an action to build, update, or remove an index, data table, or other data structure. As described herein, determining the proactive database management operation may be based on the set of stream computing data which indicates the set of stream computing environment statistics. In embodiments, determining may include analyzing the set of stream computing environment statistics to identify a preliminary notification of an upcoming (e.g., impending, expected) data flow pattern, and ascertaining a database management operation configured to accommodate the delivery (e.g., or lack thereof) of data from the stream computing environment. As an example, a collected set of stream computing data may be analyzed, and it may be determined that the set of stream computing environment statistics indicate an incoming arrival of 10,000 records of data. Accordingly, based on the set of stream computing environment statistics, a proactive database management operation to insert an additional 10,000 rows in a data table for storage of the incoming records may be determined. Other methods of determining the proactive database management operation are also possible.

At block 890, the proactive database management operation may be performed. The performing may occur with respect to the DBMS. The proactive database management operation may be performed to manage the DBMS using the set of stream computing data. Generally, performing can include initiating, carrying-out, instantiating, accomplishing, completing, or otherwise executing the proactive database management operation to manage the DBMS. Performing the proactive database management operation may include implementing a database management operation with respect to the DBMS in accordance with the proactive database management operation determined based on the set of stream computing data. The proactive database management operation may be performed in advance of data (e.g., tuples) being received from the stream computing environment. In embodiments, performing can include creating a set of instructions indicating the proactive database management operation, and passing the set of instructions to a DBMS management module to be carried-out. For instance, in response to determining the proactive database management operation based on the set of stream computing data, an SQL command specifying the proactive database management operation may be generated and inserted into a queue to be carried-out in the DBMS in a subsequent operational cycle. As an example, in response to determining a proactive database management operation of "generate a data table having 80 rows by 60 columns," an SQL command indicating the proactive database management operation may be created and transmitted to a DBMS management module for scheduling. Accordingly, the DBMS management module may read the SQL command, and generate a data table having 80 rows by 60 columns as requested. Other methods of performing the proactive database management operation are also possible.

Consider the following example. A set of stream computing data which indicates a set of stream computing environment statistics may be collected. The set of stream computing data may indicate that a forecasted set of tuples is expected to be delivered to a DBMS within a particular temporal period (e.g., 40 seconds). The forecasted set of tuples may include a total of 20,000 records, where 12,000 of the records relate to new records (e.g., not currently stored in the DBMS) and 8000 of the records relate to updates to current database entries stored in an existing index. The set of stream computing data may be analyzed to determine a proactive database management operation for performance with respect to the DBMS. In embodiments, as described herein, analyzing may include identifying a database resource usage profile for the forecasted set of tuples. The database resource usage profile may indicate that the 20,000 records all pertain to data associated with a high query volume (e.g., queries requesting data from one or more of the 20,000 records are frequently received). The database resource usage profile may be compared to a log of historical database management operations that indicates that other sets of tuples associated with high query volumes are recommended to be maintained in dedicated indices to facilitate data search and retrieval. Accordingly, a proactive database management operation may be determined that indicates generation of a new dedicated index having 20,000 blank rows (e.g., for storage of the incoming records) as well as transferring of the 8000 current records from the existing index to the new index (e.g., to be updated). In response to determination of the proactive database management operation, a DBMS management module may be configured to schedule the proactive database management operation for performance prior to the forecasted set of tuples being delivered to the DBMS. Other methods of managing the DBMS using a proactive database management operation based on a set of stream computing data are also possible.

Method 800 concludes at block 899. As described herein, aspects of method 800 relate to managing a DBMS using a set of stream computing data derived from a stream computing environment. Aspects of method 800 may provide performance or efficiency benefits related to DBMS management. For example, data structures in the DBMS may be modified (e.g., built, updated, removed) based on the set of stream computing data to prepare the DBMS for arrival of data from a stream computing environment in advance of the data being delivered to the DBMS. Accordingly, DBMS resources may be managed in accordance with forecasted data traffic. Aspects may save resources such as bandwidth, processing, or memory.

Figure 9:
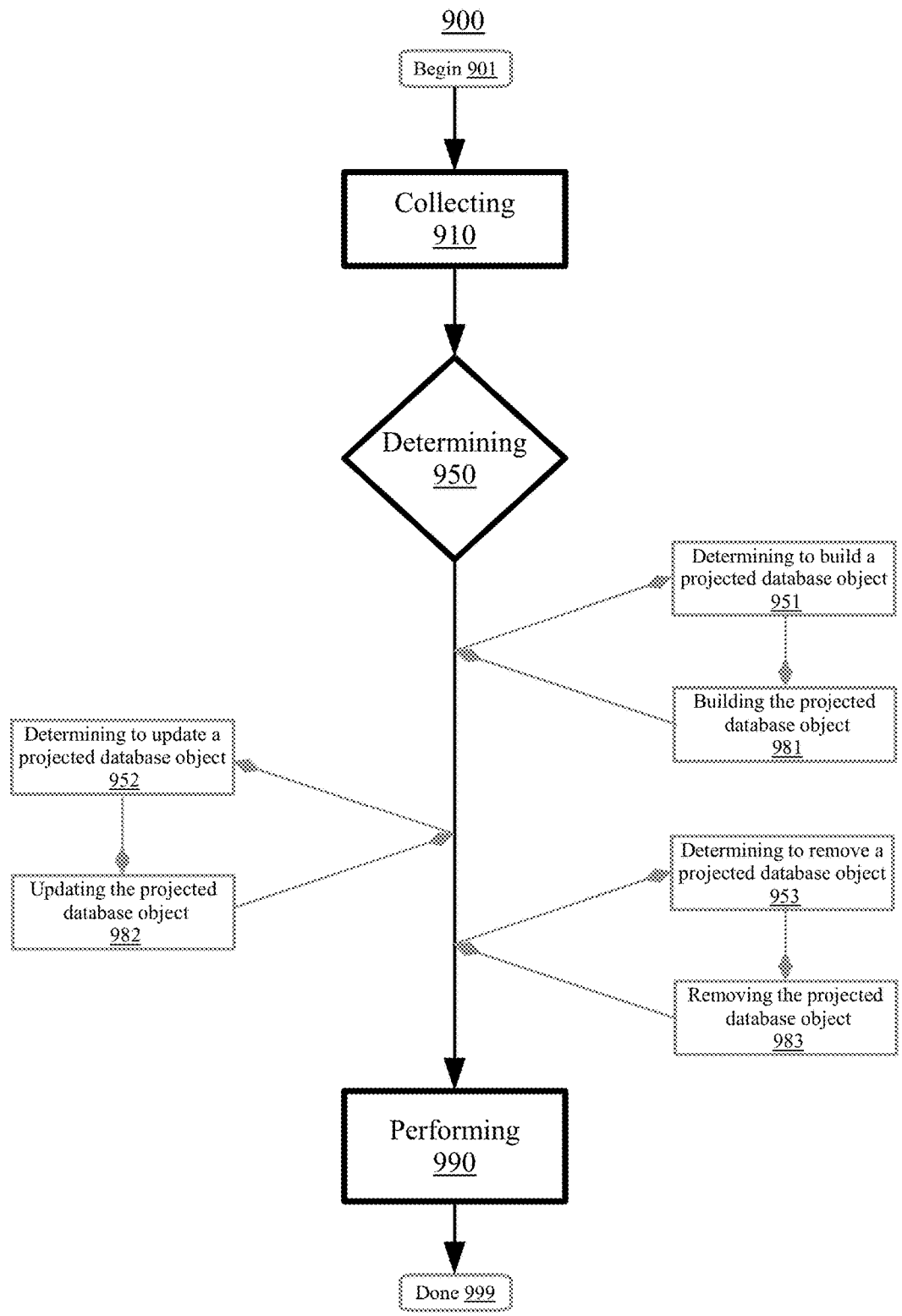
FIG. 9 is a flowchart illustrating a method for managing a DBMS using a set of stream computing data derived from a stream computing environment, according to embodiments.

FIG. 9 is a flowchart illustrating a method 900 for managing a DBMS using a set of stream computing data derived from a stream computing environment. Aspects of method 900 relate to building, updating, and removing a projected database object with respect to the DBMS based on the set of stream computing data which indicates the set of stream computing environment statistics. In embodiments, the projected database object may include a data structure that includes a representation of the state of the DBMS after performance of one or more database operations (e.g., anticipated database management operations, proactive database management operations). For instance, the projected database object may include an entire database, a set of tables, a set of indexes, a set of Maintained Temporary Indexes (MTIs), a set of Materialized Query Tables (MQTs), or other data structures configured to represent the state of one or more portions of the DBMS after completion of one or more insert, update, or delete operations indicated by the set of stream computing data. The projected database object may be maintained separately from the DBMS, and be configured to provide a preview of the DBMS at a future point in time (e.g., 30 seconds, 1 minute, 5 hours, 1 day). Aspects may be similar or the same as aspects of method 800, and aspects may be used interchangeably. The method 900 may begin at block 901.

At block 910, the set of stream computing data may be collected. The collecting may occur with respect to the stream computing environment. The set of stream computing data may indicate a set of stream computing environment statistics. At block 950, a proactive database management operation may be determined. The determining may occur based on the set of stream computing data which indicates the set of stream computing environment statistics. The proactive database management operation may be determined for performance with respect to the DBMS.

In embodiments, it may be determined to build a projected database object with respect to the DBMS at block 951. The determining may occur based on the set of stream computing data which indicates the set of stream computing environment statistics. Generally, determining can include formulating, resolving, computing, calculating, identifying, or otherwise ascertaining to build the projected database object with respect to the DBMS. In embodiments, determining to build the projected database object may include analyzing the set of stream computing data, and resolving that a number of expected changes (e.g., database management operations including inserts, updates, and deletes indicated by the set of stream computing data) exceeds a modification threshold with respect to the DBMS (e.g., the projected database object may be useful to illustrate the state of the DBMS after the upcoming changes have been implemented). Accordingly, in response to resolving that the number of expected changes exceeds the modification threshold, it may be determined to build the projected database object with respect to the DBMS. Other methods of determining to build the projected database object with respect to the DBMS are also possible.

In embodiments, the projected database object may be built at block 981. The building may occur with respect to the DBMS. The projected database object may be built to manage the DBMS using the set of stream computing data. Generally, building can include assembling, instantiating, constructing, generating, creating, structuring, or otherwise establishing the projected database object to manage the DBMS using the set of stream computing data. In embodiments, building the projected database object may include creating a copy (e.g., replication, duplicate, mirrored version) of the DBMS in its existing state, and subsequently performing one or more expected (e.g., anticipated) database management operations that are indicated by the set of stream computing data to create a predicted representation of the DBMS at a future point in time. Consider the following example. A set of stream computing data may be detected that indicates that a batch of tuples including 4000 new records will be received by the DBMS in 5 minute intervals for at least the next 30 minutes. Accordingly, building the projected database object may include creating a copy of the DBMS in its existing state, and subsequently performing a set of row insert operations to model the predicted state of the DBMS after 30 minutes. For instance, the projected database object may be built to include 24,000 additional rows to illustrate how the DBMS may look after 30 minutes have passed and 6 batches of tuples having 4,000 records each have been received. In embodiments, the projected database object may be used to process an operation (e.g., query) with respect to the DBMS. For instance, a query that requests a value for the number of rows in the DBMS may be processed using the projected database object to provide a result set for the query that includes the rows created for the incoming batches of tuples. Other methods of building the projected database object are also possible.

In embodiments, determining to update may occur at block 952. It may be determined to update a projected database object with respect to the DBMS. The determining may occur based on the set of stream computing data which indicates the set of stream computing environment statistics. Generally, determining can include formulating, resolving, computing, calculating, identifying, or otherwise ascertaining to update the projected database object with respect to the DBMS. In embodiments, determining to update the projected database object may include examining the set of stream computing data, and ascertaining that a number of expected changes (e.g., database management operations including inserts, updates, and deletes indicated by the set of stream computing data) exceeds a modification count threshold with respect to either the DBMS or the existing projected database object (e.g., such that the projected database object is expected to be substantially modified with respect to its current state). Accordingly, in response to ascertaining that the number of expected changes exceeds the modification count threshold, it may be determined to update the projected database object with respect to the DBMS. Other methods of determining to update the projected database object with respect to the DBMS are also possible.

In embodiments, the projected database object may be updated at block 982. The updating may occur with respect to the DBMS. The projected database object may be updated to manage the DBMS using the set of stream computing data. Generally, updating can include modifying, revising, refreshing, amending, reorganizing, or otherwise bringing the projected database object up to date. In embodiments, updating the projected database object may include performing one or more database management operations to modify one or more portions of an existing projected database object based on the set of stream computing data. For instance, modifying may include creating additional data structures (e.g., indexes, tables, MTIs, MQTs), deleting data structures, adding rows, deleting rows, updating values, and the like as indicated by the set of stream computing data. Consider the following example. A set of stream computing data may be detected that indicates that a burst of network traffic including updates to values of 60,000 data cells is expected to be delivered to the DBMS (e.g., such that the DBMS may not be able to process all the updates at once). Accordingly, in embodiments, updating the projected database object may include writing the updated data values to a temporary storage partition accessible by the projected database object until they can be processed and implemented with respect to the DBMS. As such, queries directed to the DBMS that relate to data cells updated by the burst of network traffic may be processed using the MTI to facilitate provision of up-to-date results. Other methods of updating the projected database object are also possible.

In embodiments, determining to remove may occur at block 953. It may be determined to remove a projected database object with respect to the DBMS. The determining may occur based on the set of stream computing data which indicates the set of stream computing environment statistics. Generally, determining can include formulating, resolving, computing, calculating, identifying, or otherwise ascertaining to remove the projected database object with respect to the DBMS. In embodiments, determining to remove the projected database object may include evaluating the set of stream computing data, and resolving that a number of expected changes (e.g., database management operations including inserts, updates, and deletes indicated by the set of stream computing data) fails to achieve a modification count threshold with respect to the DBMS or the projected database object (e.g., such that the projected database object is no longer necessary). Accordingly, in response to resolving that the number of expected changes fails to achieve the modification count threshold, it may be determined to remove the projected database object with respect to the DBMS. Other methods of determining to remove the projected database object with respect to the DBMS are also possible.

In embodiments, the projected database object may be removed at block 983. The removing may occur with respect to the DBMS. The projected database object may be removed to manage the DBMS using the set of stream computing data. Generally, removing can include deleting, clearing, discarding, nullifying, invalidating, or terminating the projected database object with respect to the DBMS. In embodiments, removing the projected database object may include erasing one or more portions of an existing projected database object based on the set of stream computing data. For instance, in embodiments, removing may include merging (e.g., unifying, combining, transferring data from) the projected database object with the DBMS, and subsequently deleting the projected database object as indicated by the set of stream computing data. Consider the following example. A set of stream computing data may be detected that indicates that the stream computing environment is currently experiencing a low-usage period, and that no additional data is incoming with respect to the DBMS. Accordingly, in embodiments, removing the projected database object may include formatting a memory partition corresponding to the projected database object to delete the projected database object (e.g., as it is no longer needed, and system resources may be reallocated to other aspects of the system). As such, queries directed to the projected database object may be re-routed to and processed by the DBMS. Other methods of removing the projected database object are also possible.

At block 990, the proactive database management operation may be performed. The performing may occur with respect to the DBMS. The proactive database management operation may be performed to manage the DBMS using the set of stream computing data. Method 900 concludes at block 999. As described herein, aspects of method 900 relate to managing a DBMS using a set of stream computing data derived from a stream computing environment. Aspects of method 900 may provide performance or efficiency benefits related to automated query modification. Aspects may save resources such as bandwidth, processing, or memory. Altogether, leveraging stream statistics with respect to a database management system may be associated with benefits including database operation performance, resource utilization, and database management efficiency.

Figure 10:
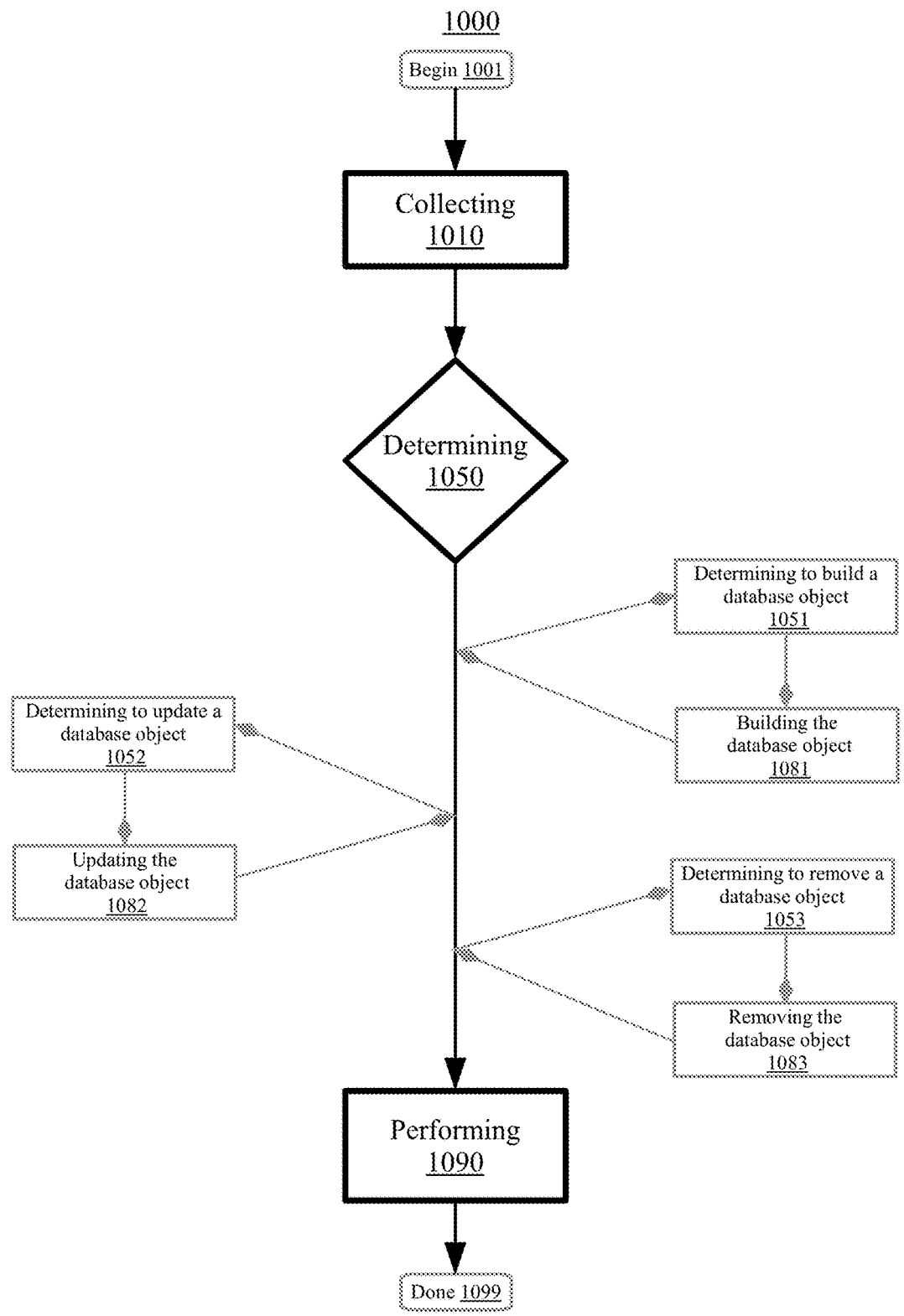
FIG. 10 is a flowchart illustrating a method for managing a DBMS using a set of stream computing data derived from a stream computing environment, according to embodiments.

FIG. 10 is a flowchart illustrating a method 1000 for managing a DBMS using a set of stream computing data derived from a stream computing environment. Aspects of method 1000 relate to building, updating, and removing a database object with respect to the DBMS based on the set of stream computing data which indicates the set of stream computing environment statistics. The database object may include a data structure configured to manage data, values, and records within the DBMS. The database object may be generated based on the set of stream computing data to prepare the DBMS for one or more database operations prior to arrival of data from the stream computing environment. As examples, the database object may include a regular index, a partial index, a set of tables, an entire database, a set of Maintained Temporary Indexes (MTIs), a set of Materialized Query Tables (MQTs), or other data structures to manage data with respect to the DBMS. Aspects may be similar or the same as aspects of method 800/900, and aspects may be used interchangeably. Altogether, leveraging stream statistics with respect to a database management system may be associated with benefits including database operation performance, resource utilization, and database management efficiency. The method 1000 may begin at block 1001.

At block 1010, the set of stream computing data may be collected. The collecting may occur with respect to the stream computing environment. The set of stream computing data may indicate a set of stream computing environment statistics. At block 1050, a proactive database management operation may be determined. The determining may occur based on the set of stream computing data which indicates the set of stream computing environment statistics. The proactive database management operation may be determined for performance with respect to the DBMS.

In embodiments, determining to build may occur at block 1051. It may be determined to build a database object with respect to the DBMS. The determining may occur based on the set of stream computing data which indicates the set of stream computing environment statistics. In embodiments, determining to build the database object may include analyzing the set of stream computing data, and identifying that one or more database objects are expected to be associated with positive impacts with respect to managing a set of incoming data from the stream computing environment (e.g., based on historical usage data). Accordingly, in response to identifying the one or more database objects, it may be determined to build the one or more database objects with respect to the DBMS. Other methods of determining to build one or more database objects with respect to the DBMS are also possible.

In embodiments, the database object may be built at block 1081. The building may occur with respect to the DBMS. The database object may be built to manage the DBMS using the set of stream computing data. Generally, building can include assembling, instantiating, constructing, generating, creating, structuring, or otherwise establishing the database object to manage the DBMS using the set of stream computing data. In embodiments, building the database object may include generating one or more of a regular index, a partial index, a set of tables, an entire database, a set of Maintained Temporary Indexes (MTIs), a set of Materialized Query Tables (MQTs), or other data structures to manage data with respect to the DBMS as indicated by the set of stream computing data (e.g., to prepare the DBMS for incoming data from the stream computing environment). Consider the following example. A set of stream computing data may be detected that includes a query having a set of result data set stored in a Table A of the DBMS. Accordingly, building the database object may include generating a Materialized Query Table (MQT) such that, when the query is processed, the set of result data may be ingested by and maintained in the MQT (e.g., rather than in the underlying Table A) to facilitate ease of data organization and result analysis. Other methods of building the database object are also possible.

In embodiments, determining to update may occur at block 1052. It may be determined to update a database object with respect to the DBMS. The determining may occur based on the set of stream computing data which indicates the set of stream computing environment statistics. Generally, determining can include formulating, resolving, computing, calculating, identifying, or otherwise ascertaining to update the database object with respect to the DBMS. In embodiments, determining to update the database object may include examining the set of stream computing data, and ascertaining that a number of expected changes (e.g., database management operations including inserts, updates, and deletes indicated by the set of stream computing data) exceeds a modification count threshold with respect to the DBMS (e.g., such that an existing database object is expected to be substantially modified with respect to its current state). Accordingly, in response to ascertaining that the number of expected changes exceeds the modification count threshold, it may be determined to update the database object with respect to the DBMS. Other methods of determining to update the database object with respect to the DBMS are also possible.

In embodiments, the database object may be updated at block 1082. The updating may occur with respect to the DBMS. The database object may be updated to manage the DBMS using the set of stream computing data. Generally, updating can include modifying, revising, refreshing, amending, reorganizing, or otherwise bringing the database object up to date. In embodiments, updating the database object may include performing one or more database management operations to modify one or more portions of an existing database object based on the stream computing data. For instance, modifying may include creating additional data objects, deleting data structures, adding rows, deleting rows, updating values, and the like as indicated by the set of stream computing data. Consider the following example. A set of stream computing data may be detected that indicates that a group of incoming data traffic from the stream computing environment includes a group of 12,000 new records. Accordingly, in embodiments, updating the database object may include extending an index or data table by 12,000 rows to accommodate storage of the 12,000 new records within the DBMS. As another example, updating the database object may include re-balancing an index based on a set of values about to be inserted (e.g., as indicated by the set of stream computing data). Other methods of updating the database object are also possible.

In embodiments, determining to remove may occur at block 1053. It may be determined to remove a database object with respect to the DBMS. The determining may occur based on the set of stream computing data which indicates the set of stream computing environment statistics. Generally, determining can include formulating, resolving, computing, calculating, identifying, or otherwise ascertaining to remove the database object with respect to the DBMS. In embodiments, determining to remove the database object may include evaluating the set of stream computing data, and resolving that a number of expected changes (e.g., database management operations including inserts, updates, and deletes indicated by the set of stream computing data) fails to achieve a modification count threshold with respect to the database object or (e.g., such that the database object is no longer necessary). Accordingly, in response to resolving that the number of expected changes fails to achieve the modification threshold, it may be determined to remove the database object with respect to the DBMS. Other methods of determining to remove the database object with respect to the DBMS are also possible.

In embodiments, the database object may be removed at block 1083. The removing may occur with respect to the DBMS. The database object may be removed to manage the DBMS using the set of stream computing data. Generally, removing can include deleting, clearing, discarding, nullifying, invalidating, or terminating the database object with respect to the DBMS. In embodiments, removing the database object may include deleting one or more existing database objects based on the set of stream computing data. In embodiments, removing the database object may be associated with positive impacts with respect to database resource management. Consider the following example. A set of stream computing data may be detected that indicates that the incoming data traffic of the stream computing environment is related to an Index A of the DBMS, and that no upcoming queries or other data traffic pertains to a Partial Index W of the DBMS. Accordingly, in embodiments, removing the database object may include eliminating the Partial Index W of the DBMS, and reallocating database resources that were previously used to manage the Partial Index W to the Index A of the DBMS. Other methods of removing the database object are also possible.

At block 1090, the proactive database management operation may be performed. The performing may occur with respect to the DBMS. The proactive database management operation may be performed to manage the DBMS using the set of stream computing data. Method 1000 concludes at block 1099. As described herein, aspects of method 1000 relate to managing a DBMS using a set of stream computing data derived from a stream computing environment. Aspects of method 1000 may provide performance or efficiency benefits related to automated query modification. Aspects may save resources such as bandwidth, processing, or memory. Altogether, leveraging stream statistics with respect to a database management system may be associated with benefits including database operation performance, resource utilization, and database management efficiency.

Figure 11:
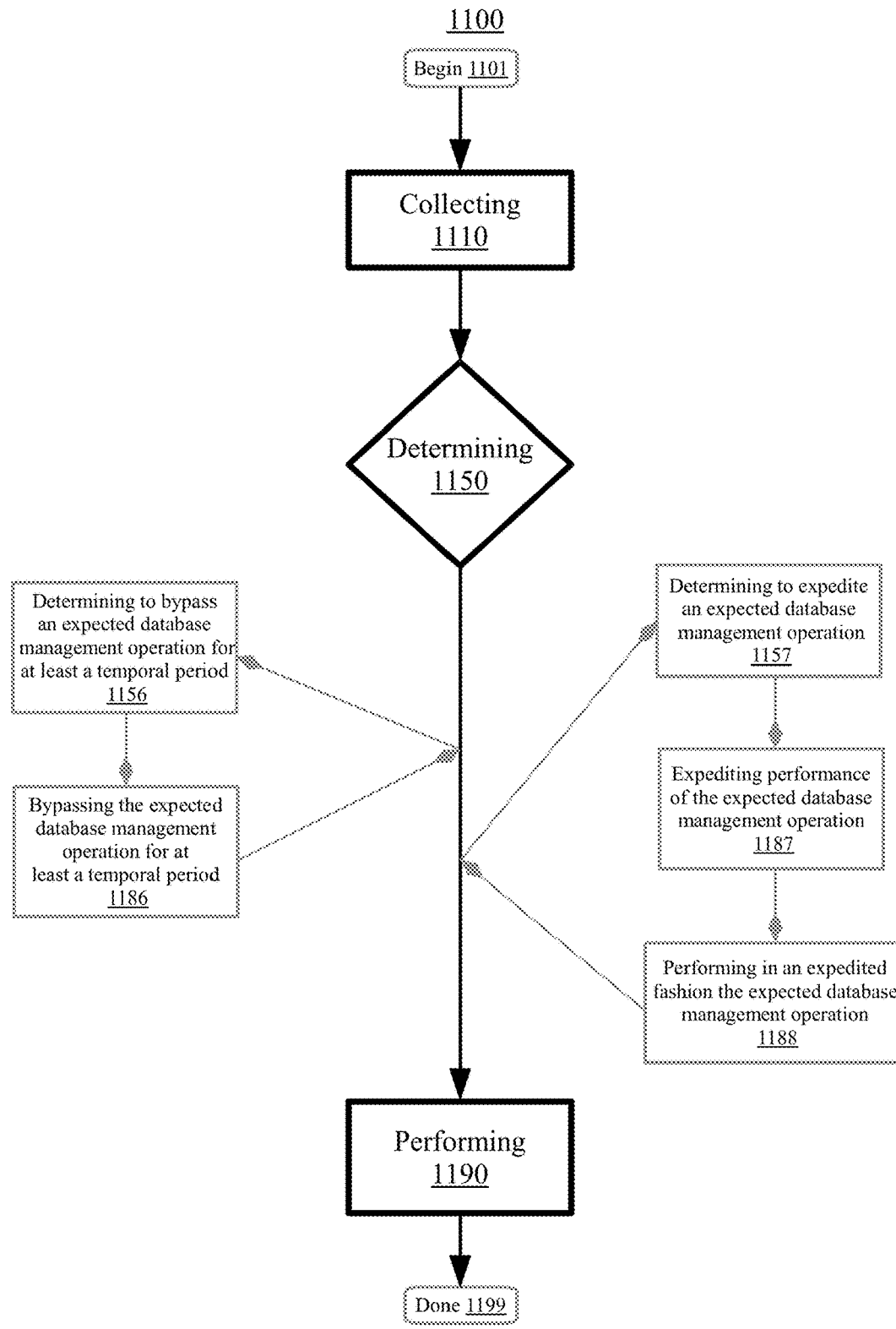
FIG. 11 is a flowchart illustrating a method for managing a DBMS using a set of stream computing data derived from a stream computing environment, according to embodiments.

FIG. 11 is a flowchart illustrating a method 1100 for managing a DBMS using a set of stream computing data derived from a stream computing environment. Aspects of method 1100 relate to bypassing or expediting performance of an expected database management operation based on the set of stream computing data which indicates the set of stream computing environment statistics. Aspects may be similar or the same as aspects of method 800/900/1000, and aspects may be used interchangeably. Altogether, leveraging stream statistics with respect to a database management system may be associated with benefits including database operation performance, resource utilization, and database management efficiency. The method 1100 may begin at block 1101.

At block 1110, the set of stream computing data may be collected. The collecting may occur with respect to the stream computing environment. The set of stream computing data may indicate a set of stream computing environment statistics. At block 1150, a proactive database management operation may be determined. The determining may occur based on the set of stream computing data which indicates the set of stream computing environment statistics. The proactive database management operation may be determined for performance with respect to the DBMS.

In embodiments, it may be determined to bypass an expected database management operation at block 1156. The determining may occur based on the set of stream computing data which indicates the set of stream computing environment statistics. The expected database management operation may determined to be bypassed with respect to the DBMS for at least a temporal period. Generally, determining can include formulating, resolving, computing, calculating, identifying, or otherwise ascertaining to bypass the expected database management operation. The expected database management operation may include an action, process, procedure, or other activity that is expected to be performed in the DBMS in response to arrival of a forecasted set of tuples from the stream computing environment (e.g., imminent management operation which may occur soon; query processing). In embodiments, determining to bypass the expected database management operation may include examining the set of stream computing environment statistics and ascertaining that performing the expected database management operation at a later time may positively impact database management efficiency. For instance, performing the expected database management operation at the later time may save processing or memory resources, negate a redundant operation, or allow for a more accurate query result (e.g., as more data is received by the DBMS). As an example, consider a situation in which an expected database management operation to generate an index with respect to a set of 30,000 existing records of the DBMS is scheduled for performance. A set of stream computing environment statistics may be detected and analyzed, and it may be identified that an incoming batch of tuples includes an additional 15,000 new records. Accordingly, in embodiments, it may be determined to bypass the expected database management operation to generate the index until the batch of tuples is received, such that the index can be generated using the total set of 45,000 records (e.g., rather than performing separate operations to manage the existing records and the new records independently). Other methods of determining to bypass the expected database management operation are also possible.

In embodiments, the expected database management operation may be bypassed for at least a temporal period at block 1186. The bypassing may occur with respect to the DBMS. The expected database management operation may be bypassed to manage the DBMS using the set of stream computing data. Generally, bypassing can include skipping, disregarding, not performing, postponing, suspending, omitting, or delaying the expected database management operation for at least a temporal period. The temporal period may include a time frame defined based on a predetermined time duration (e.g., 30 seconds, 1 minute, 1 hour, indefinite), a designated point in time (e.g., 3:00 PM, 6:00 AM) or a triggering event (e.g., delay until reception of a set of data from the stream computing environment). In embodiments, bypassing the expected database management operation may include using a database operation scheduler to postpone performance of the expected database management operation until a later time (e.g., postpone until 4:30 PM, postpone for 2 hours). In embodiments, bypassing the expected database management operation may include configuring the expected database management operation to be automatically initiated in response to detecting achievement of a triggering event. Consider the following example. A query may be received by the DBMS that includes a "SELECT" operation that requests fetching of a set of records associated with a particular attribute (e.g., "blue") from an index. In response to analyzing the set of stream computing environment statistics, it may be ascertained that an incoming batch of tuples includes a number of tuples associated with the particular attribute (e.g., the number of tuples exceeds a threshold number of tuples, such as 1500 "blue" tuples). Accordingly, bypassing may include delaying processing of the query until the batch of tuples has been received by the DBMS (e.g., such that the newly received tuples having the desired attribute may also be included in the results for the query). Other methods of bypassing the expected database management operation for at least the temporal period are also possible.

In embodiments, it may be determined to expedite an expected database management operation with respect to the DBMS at block 1157. The determining may be based on the set of stream computing data which indicates the set of stream computing environment statistics. Generally, determining can include formulating, resolving, computing, calculating, identifying, or otherwise ascertaining to expedite the expected database management operation. In embodiments, determining to expedite the expected database management operation may include examining the set of stream computing environment statistics, and resolving that performing the expected database management operation at an earlier time or with a greater resource allocation may positively impact database management efficiency. For instance, performing the expected database management operation at an earlier time may save processing or memory resources, make efficient use of existing resource allocations, or facilitate faster result generation. As an example, consider a situation in which a query pertaining to data retrieval from a Table A of the DBMS is scheduled for performance. A set of stream computing environment statistics may be detected and analyzed, and it may be identified that an incoming batch of tuples includes a high volume of data traffic that exceeds a resource usage threshold (e.g., such that available database resources are expected to be largely occupied by processing of the batch of tuples). Accordingly, in embodiments, it may be determined to expedite the expected database management operation to retrieve the requested data from Table A before the batch of tuples is received (e.g., such that resolution of the query is not slowed down by the influx of the high volume of data traffic). Other methods of determining to expedite the expected database management operation are also possible.

In embodiments, performance of the expected database management operation may be expedited at block 1187. The expediting may occur with respect to the DBMS. Performance of the expected database management operation may be expedited to manage the DBMS using the set of stream computing data. Generally, expediting can include accelerating, promoting, advancing, quickening, hastening, speeding-up, or otherwise prioritizing performance of the expected database management operation. In embodiments, expediting the expected database management operation may include performing the expected database management operation sooner that it was originally scheduled. For instance, expediting may include using a database operation scheduler to advance performance of the expected database management operation to an earlier time (e.g., 2:00 PM rather than 2:30 PM). In embodiments, expediting may include using a database management module to modify resource allocations for different database management operations, and allotting additional system resources (e.g., memory, processing power) for performance. In embodiments, the expected database management operation may be performed in an expedited fashion at block 1188. The expected database management operation may be performed in an expedited fashion with respect to the DBMS. Generally, performing can include initiating, carrying-out, instantiating, accomplishing, completing, or otherwise executing the expected database management operation in an expedited fashion (e.g., prioritized, at a sooner time, with additional resources) with respect to the DBMS. In embodiments, performing may include assigning an operational priority to the expected database management operation to indicate that the expected database management operation should be performed at an earlier time or assigned additional resources. Consider the following example. An expected database management operation to generate an index within the DBMS may be scheduled for performance. In response to analyzing the set of stream computing environment statistics, it may be calculated that an incoming batch of tuples is expected to be delivered to the DBMS earlier than originally anticipated (e.g., at 5:06 PM rather than 5:20 PM), and include a number of records greater than an original estimate (e.g., 14,000 records instead of 12,000 records). Accordingly, the expected database management operation to generate the index may be assigned an operation priority such that it is performed at an earlier time and with a greater amount of memory and processing resources to accommodate the incoming batch of tuples. Other methods of expediting the expected database management operation and performing the expected database management operation in an expedited fashion are also possible.

At block 1190, the proactive database management operation may be performed. The performing may occur with respect to the DBMS. The proactive database management operation may be performed to manage the DBMS using the set of stream computing data. Method 1100 concludes at block 1199. As described herein, aspects of method 1100 relate to managing a DBMS using a set of stream computing data derived from a stream computing environment. Aspects of method 1100 may provide performance or efficiency benefits related to automated query modification. Aspects may save resources such as bandwidth, processing, or memory. Altogether, leveraging stream statistics with respect to a database management system may be associated with benefits including database operation performance, resource utilization, and database management efficiency.

Figure 12:
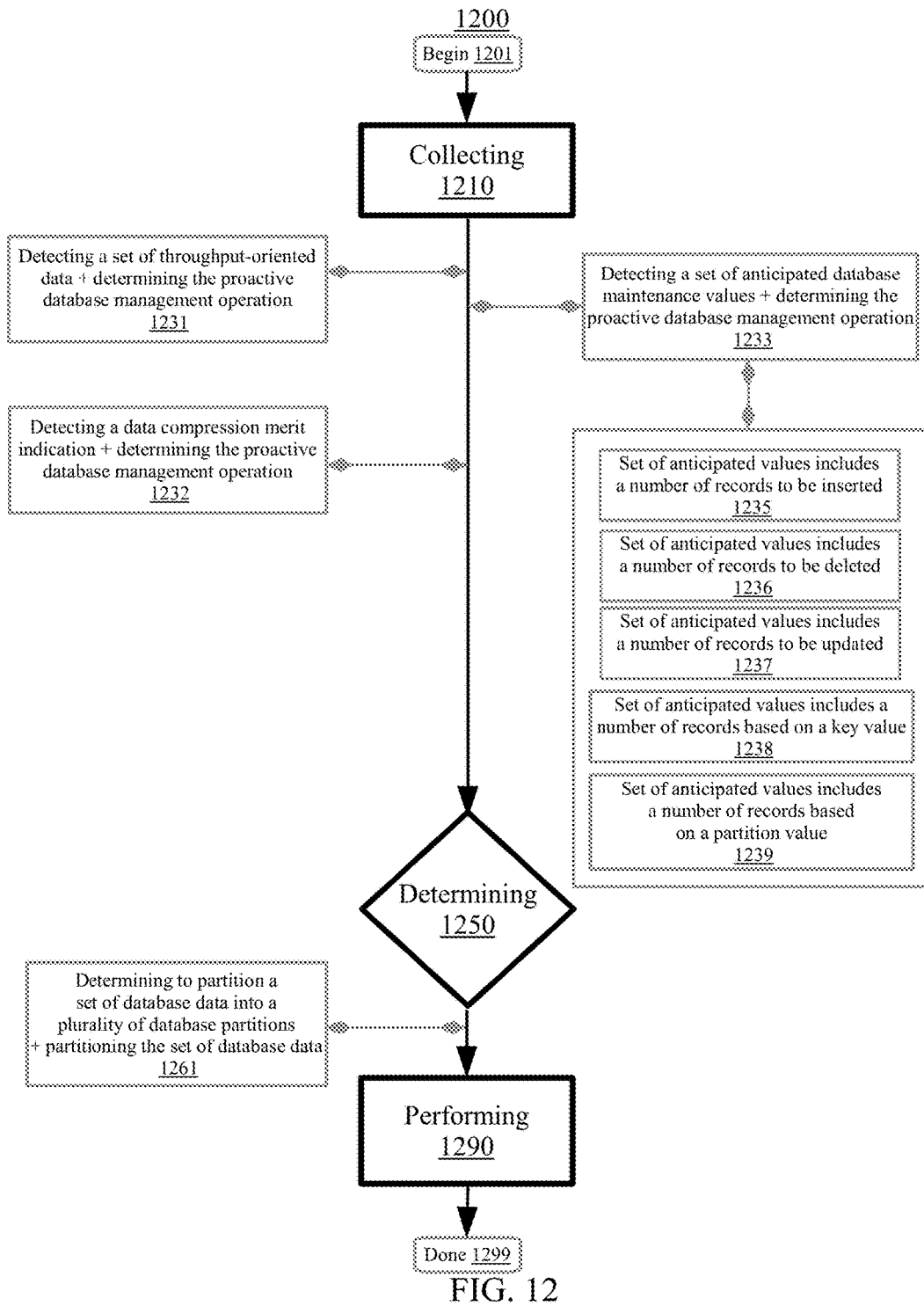
FIG. 12 is a flowchart illustrating a method for managing a DBMS using a set of stream computing data derived from a stream computing environment, according to embodiments.

FIG. 12 is a flowchart illustrating a method 1200 for managing a DBMS using a set of stream computing data derived from a stream computing environment. Aspects of method 1200 relate to utilizing the set of stream computing data to determine one or more proactive database management operations for performance with respect to the DBMS. Aspects may be similar or the same as aspects of other methods described herein, and aspects may be used interchangeably. Altogether, leveraging stream statistics with respect to a database management system may be associated with benefits including database operation performance, resource utilization, and database management efficiency.

The method 1200 may begin at block 1201. At block 1210, the set of stream computing data may be collected. The collecting may occur with respect to the stream computing environment. The set of stream computing data may indicate a set of stream computing environment statistics.

In embodiments, detecting and determining may occur at block 1231. A set of throughput-oriented data may be detected. The detecting may occur with respect to the set of stream computing data which indicates the set of stream computing environment statistics. Generally, detecting can include sensing, recognizing, discovering, identifying, or otherwise ascertaining the set of throughput-oriented data. The set of through-put oriented data may include information regarding the volume of data traffic that passes through a particular area of the stream computing environment in a given time frame. For instance, the set of through-put oriented data may indicate the tuple throughput rate (e.g., 400 tuples per second), the data flow rate (e.g., 6 gigabytes per minute), the average time it takes for a tuple to flow through a portion of the operator graph, or other throughput statistics for the stream computing environment. In embodiments, the set of through-put data may include information related to a congestion factor of the stream computing environment. For instance, the set of through-put data may include a quantitative indication of the overall congestion of the stream computing environment (e.g., overall congestion of 18%), the average number of tuples waiting in queues/windows/buffers at each operator (e.g., 40 tuples), the average time it takes for a tuple to be processed by a stream operator (e.g., 12 seconds), the frequency of bottleneck occurrence (e.g., once every 6 hours) or other information regarding the state of congestion in the stream computing environment. In embodiments, detecting the set of throughput oriented data may include using a stream computing diagnostics tool to monitor the data traffic of the stream computing environment and collect the set of through-put oriented data. Based on the set of throughput-oriented data, the proactive database management operation may be determined for performance with respect to the DBMS. Generally, determining can include formulating, resolving, computing, calculating, identifying, or otherwise ascertaining the proactive database management operation based on the set of throughput oriented data. In embodiments, determining the proactive database management operation may include analyzing the set of throughput oriented data to ascertain an expected data traffic volume (e.g., 1000 tuples, 200 megabytes of data) and an expected arrival time for the expected data traffic volume (e.g., 15 seconds, 2:13:46), and subsequently ascertaining a proactive database management operation based on the expected data traffic volume and the expected arrival time for the expected data traffic volume. For instance, in response to ascertaining that the expected data traffic volume exceeds a data traffic threshold, additional database objects (e.g., indices, tables) may be constructed to manage the incoming traffic. Other methods of detecting the set of through-put oriented data and determining the proactive database management operation are also possible.

In embodiments, detecting and determining may occur at block 1232. A data compression merit indication may be detected. The detecting may occur with respect to the set of stream computing data which indicates the set of stream computing environment statistics. Generally, detecting can include sensing, recognizing, discovering, identifying, or otherwise ascertaining the data compression merit indication. The data compression merit indication may include a qualitative or quantitative representation of the benefit or value achieved by compressing data (e.g., for storage within the DBMS). For instance, the data compression merit indication may indicate the resource savings in terms of processor, memory, or storage resources (e.g., 3.0 gigahertz of processing power saved, 4 gigabytes of memory saved, 5 gigabytes of storage space saved). As another example, the data compression merit indication may include a currency value to represent the cost savings of data compression (e.g., $1500 dollars saved by data compression techniques over 8 months). In embodiments, the data compression indication may include a binary representation (e.g., yes or no, 1 or 0, positive or negative) of whether or not data compression was worthwhile (e.g., saved resources compared to not compressing the data, or using other data compression techniques). In embodiments, detecting may include calculating the amount of system resources that would have been used by a set of uncompressed data, and comparing that with the actual amount of system resources used by the same set of compressed data to formulate the data compression merit indication. Based on the data compression merit indication, the proactive database management operation may be determined for performance with respect to the DBMS. Generally, determining can include formulating, resolving, computing, calculating, identifying, or otherwise ascertaining the proactive database management operation based on the set of throughput oriented data. In embodiments, determining the proactive database management operation may include examining the data compression merit indication to ascertain whether or not compression of an incoming set of data is expected to be associated with positive impacts with respect to system resource usage, and determining the proactive database management operation based on the outcome of the examination. As an example, in response to ascertaining that a particular data compression algorithm has had positive impacts with respect to data of a certain type (e.g., in the past, based on historical data), the same data compression algorithm may be utilized to manage an incoming set of data of the same type and store it in the DBMS. Other methods of detecting the data compression merit indication and determining the proactive database management operation are also possible.

In embodiments, detecting and determining may occur at block 1233. A set of anticipated database maintenance values may be detected. The detecting may occur with respect to the set of stream computing data which indicates the set of stream computing environment statistics. Generally, detecting can include sensing, recognizing, discovering, identifying, or otherwise ascertaining the set of anticipated database maintenance values. The set of anticipated database maintenance values may include estimated or calculated values that indicate forecasted or expected changes with respect to one or more records stored in the DBMS. As an example, the set of anticipated database maintenance values may indicate a number of records that are expected to be modified (e.g., inserted, deleted, updated, partitioned, managed using a key value) with respect to the DBMS. In embodiments, detecting the set of anticipated database maintenance values may include analyzing the set of stream computing data to compute a number of records that are expected to be modified in the DBMS. As an example, it may be calculated based on the set of stream computing data that 1,400 records are to be inserted, and 1,900 existing records are to be updated in the DBMS. Based on the set of anticipated database maintenance values, the proactive database management operation may be determined for performance with respect to the DBMS. Generally, determining can include formulating, resolving, computing, calculating, identifying, or otherwise ascertaining the proactive database management operation based on the set of anticipated database maintenance values. As described herein, determining may include comparing the set of anticipated database maintenance values to a set of database response action rules, and determining a proactive database management operation that corresponds to the type and volume of records to be modified. For instance, in response to ascertaining (e.g., based on the anticipated database maintenance values) that a number of records less than 5,000 is to be inserted into the database, the set of database response action rules may indicate that a number of blank rows corresponding to the number of incoming records should be added to extend the database. As another example, the set of database response actions rules may indicate that, in a situation where a number of records greater than 5,000 is to be inserted into the database, a separate index or partial index should be created to manage the incoming records. Other methods of detecting the set of anticipated database maintenance values and determining the proactive database management operation are also possible.

In embodiments, the set of anticipated database maintenance values may include a set of anticipated values selected from a group. In embodiments, the set of anticipated values may include a number of records to be inserted at block 1235. The number of records to be inserted may include a quantitative indication of how many data entries are expected to be added, appended, or otherwise introduced to the DBMS (e.g., from the stream computing environment). As an example, the number of records may indicate that 9,000 records are to be appended to the DBMS. In embodiments, the set of anticipated values may include a number of records to be deleted at block 1236. The number of records to be deleted may include a quantitative indication of how many data entries that currently exist within the DBMS are expected to be removed, erased, or otherwise eliminated from the DBMS. For instance, the number of records may indicate that a partial index including 20,000 records is outdated (e.g., exceeds a recent threshold), and is scheduled for deletion upon reception of a batch of tuples from the stream computing environment. In embodiments, the set of anticipated values may include a number of records to be updated at block 1237. The set of records to be updated may include a quantitative indication of how many data entries that currently exist within the DBMS are expected to be renewed, revised, adjusted, or otherwise modified (e.g., in response to receiving data from the stream computing environment). As an example, the set of records to be updated may indicate that 270 data entries of the DBMS (e.g., temperature values for a particular location) are expected to be revised by a set of incoming data traffic from the stream computing environment. In embodiments, the set of anticipated values may include a number of records based on a key value at block 1238. The number of records based on the key value may include a quantitative indication of how many data entries of the DBMS are stored and retrieved based on a key value (e.g., unique identifier assigned to data entries to facilitate data organization and retrieval). For instance, the number of records based on the key value may indicate that 2400 data entries are stored in the DBMS in association with a key value of "K4." In embodiments, the set of anticipated values may include a number of records based on a partition value at block 1239. The number of records based on the partition value may include a quantitative indication of how many data entries of the DBMS are stored in a particular partition (e.g., particular division or independent part of the DBMS) or partition range. As an example, the number of records may indicate that 70,000 data entries are stored in a partition range between zip codes 30000 and 39999. Other types of anticipated database maintenance values are also possible.

At block 1250, a proactive database management operation may be determined. The determining may occur based on the set of stream computing data which indicates the set of stream computing environment statistics. The proactive database management operation may be determined for performance with respect to the DBMS.

In embodiments, determining and partitioning may occur at block 1261. It may be determined to partition a set of database data into a plurality of database partitions with respect to the DBMS. The determining may occur based on the set of stream computing data which indicates the set of stream computing environment statistics. Generally, determining can include formulating, resolving, computing, calculating, identifying, or otherwise ascertaining to partition a set of database data into a plurality of database partitions. The plurality of database partitions may include a division or distinct independent part/portion of the DBMS. In embodiments, determining to partition may include analyzing a set of incoming data traffic from the stream computing environment, and ascertaining that the set of incoming data traffic exceeds a threshold size (e.g., 10,000 records). Accordingly, in response to ascertaining that the set of incoming data traffic exceeds the threshold size, it may be determined to partition the set of database data (e.g., information and records stored in the DBMS) into the plurality of database partitions. The set of database data may be partitioned into the plurality of database partitions with respect to the DBMS. The set of database data may be partitioned to manage the DBMS using the set of stream computing data. Generally, partitioning can include dividing, splitting, segregating, distributing, apportioning, or otherwise separating the set of database data. In embodiments, partitioning may include analyzing the set of incoming data traffic in conjunction with the set of database data, sorting the set of incoming data traffic and the set of database data according to a list of organizational categories, and generating an independent partition within the DBMS for storage and maintenance of the data associated with each organizational category of the list of organizational categories. As an example, a set of incoming data traffic and a set of database data associated with populations for various cities may be sorted according to a list of organization categories of "States," and the population data for each city may be arranged into a separate partition based on the state it is located in (e.g., California, Texas, Florida). Other methods of determining to partition the DBMS and partitioning the DBMS into the plurality of database partitions using the set of stream computing data are also possible.

At block 1290, the proactive database management operation may be performed. The performing may occur with respect to the DBMS. The proactive database management operation may be performed to manage the DBMS using the set of stream computing data. Method 1200 concludes at block 1299. As described herein, aspects of method 1200 relate to managing a DBMS using a set of stream computing data derived from a stream computing environment. Aspects of method 1200 may provide performance or efficiency benefits related to automated query modification. Aspects may save resources such as bandwidth, processing, or memory.

Figure 13:
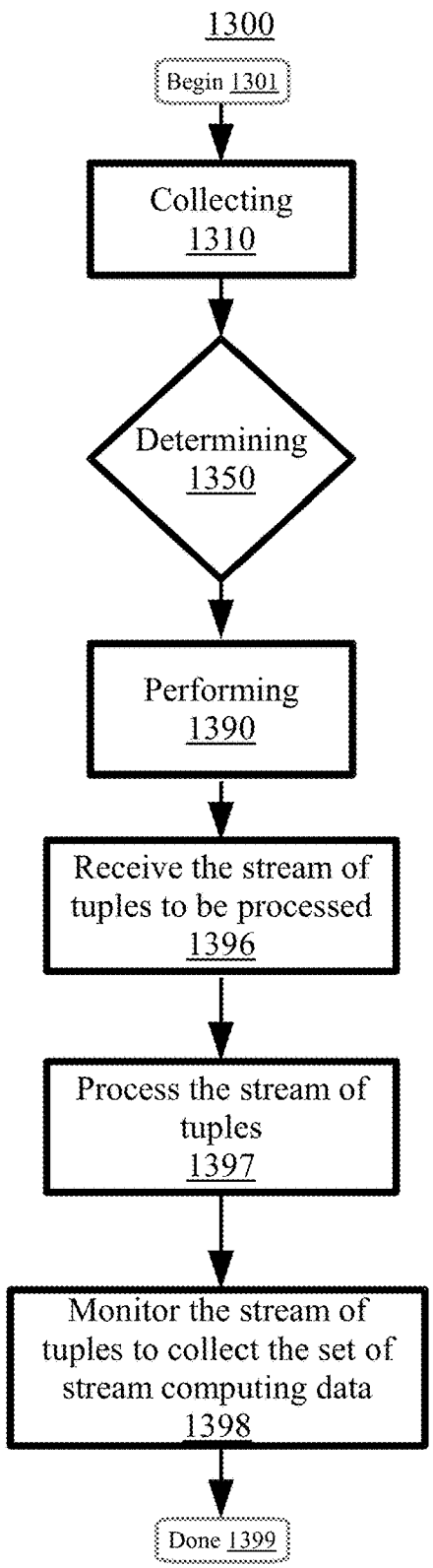
FIG. 13 is a flowchart illustrating a method for managing a DBMS using a set of stream computing data derived from a stream computing environment, according to embodiments.

FIG. 13 is a flowchart illustrating a method 1300 for managing a DBMS using a set of stream computing data derived from a stream computing environment. Aspects may be similar or the same as aspects of other methods described herein, and aspects may be used interchangeably. The method 1300 may begin at block 1301. At block 1310, the set of stream computing data may be collected. The collecting may occur with respect to the stream computing environment. The set of stream computing data may indicate a set of stream computing environment statistics. At block 1350, a proactive database management operation may be determined. The determining may occur based on the set of stream computing data which indicates the set of stream computing environment statistics. The proactive database management operation may be determined for performance with respect to the DBMS. At block 1390, the proactive database management operation may be performed. The performing may occur with respect to the DBMS. The proactive database management operation may be performed to manage the DBMS using the set of stream computing data.

At block 1396, the stream of tuples to be processed may be received. The stream of tuples may be processed by a plurality of processing elements (e.g., stream operators) operating on a set of compute nodes (e.g., in a stream application environment). The stream of tuples may be received consistent with the description herein including FIGS. 1-16. Current/future processing by the plurality of processing elements may be performed consistent with the description herein including FIGS. 1-16. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

At block 1397, the stream of tuples may be processed. The processing may occur using the set of processing elements operating on the set of compute nodes. The stream of tuples may be processed by the plurality of processing elements operating on the set of compute nodes. The stream of tuples may be processed consistent with the description herein including FIGS. 1-16. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

At block 1398, the stream of tuples may be monitored. The monitoring may occur to collect the set of stream computing data which indicates the set of stream computing environment statistics. Generally, monitoring can include scanning, observing, supervising, auditing, or otherwise tracking the stream of tuples. The stream of tuples may be monitored by the plurality of processing elements operating on the set of compute nodes. The stream of tuples may be processed consistent with the description here including FIGS. 1-16. The stream of tuples may be monitored to collect the set of stream computing data. For instance, monitoring the stream of tuples may include utilizing a streams management engine to track the amount of data traffic, tuple throughput rates, tuple attributes, stream computing environment congestion, and other information related to the stream computing environment to capture the set of stream computing data.

Method 1300 concludes at block 1399. As described herein, aspects of method 1300 relate to managing a DBMS using a set of stream computing data derived from a stream computing environment. Aspects of method 1300 may provide performance or efficiency benefits related to automated query modification. Aspects may save resources such as bandwidth, processing, or memory.

Figure 14:
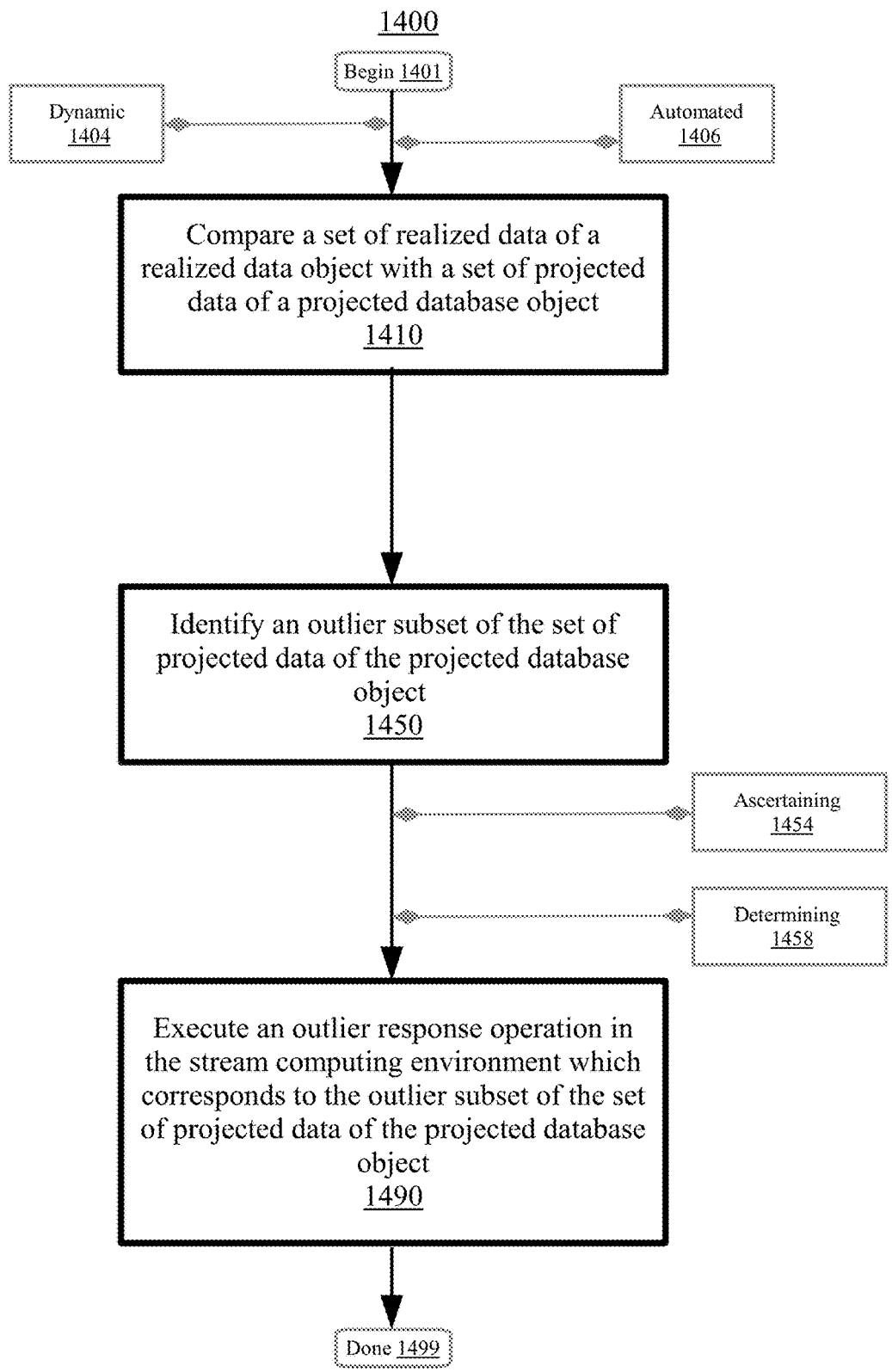
FIG. 14 is a flowchart illustrating a method for managing a stream computing environment used a projected database object, according to embodiments.

FIG. 14 is a flowchart illustrating a method 1400 for managing a stream computing environment used a projected database object, according to embodiments. Aspects of method 1400 relate to executing an outlier response operation in a stream computing environment based on an outlier subset of a set of projected data of a projected database object. Aspects of the disclosure relate to the recognition that, in some situations, stream computing data anticipated for use by a database management system (DBMS) may not be utilized by a resultant database object of the DBMS (e.g., the stream computing data may not be relevant to the DBMS, may be filtered out before the end of an operator graph, may be corrupt, or may not match a format type supported by the DBMS). Accordingly, aspects of the disclosure relate to using a projected database object to identify an outlier subset of projected data, and execute an outlier response action in the stream computing environment to positively impact performance of the stream computing environment with respect to the DBMS. In embodiments, the DBMS may include a collection of one or more software programs that facilitate storage, organization, modification, and extraction of information from a database. The DBMS may include a one or more of a variety of data structures (e.g., tables, indices, lists, queues, hash tables, Materialized Temporary Indexes, Materialized Query Tables) and support a variety of functions (e.g., definition, creation, querying, updating) for data administration. In embodiments, as described herein, the DBMS may be communicatively connected to a stream computing environment. The stream computing environment may include a platform for dynamically delivering and analyzing data in real-time. The stream computing environment may include an operator graph having a plurality of stream operators (e.g., filter operations, sort operators, join operators) and processing elements configured to perform processing operations on tuples flowing through the operator graph. Altogether, leveraging the projected database object of the DBMS with respect to the stream computing environment may be associated with benefits including data throughput performance, reduced data congestion, and resource usage efficiency. The method 1400 may begin at block 1401.

In embodiments, the comparing, the identifying, the executing, and the other steps described herein may each be executed in a dynamic fashion at block 1404. The steps described herein may be executed in a dynamic fashion to streamline management of a stream computing environment using a projected database object. For instance, the comparing, the identifying, the executing, and the other steps described herein may occur in real-time, ongoing, or on-the-fly. As an example, one or more steps described herein may be performed on-the-fly (e.g., the outlier response operation may be identified and executed in real-time based on the comparison between the set of realized data of the realized database object and the set of projected data of the projected database object) in order to streamline (e.g., facilitate, promote, enhance) management of the stream computing environment. Other methods of performing the steps described herein are also possible.

In embodiments, the comparing, the identifying, the executing, and the other steps described herein may each be executed in an automated fashion at block 1406. The steps described herein may be executed in an automatic fashion without user intervention. In embodiments, the comparing, the identifying, the executing, and the other steps described herein may be carried out by an internal stream computing environment management module maintained in a persistent storage device of a local computing device (e.g., network node). In embodiments, the comparing, the identifying, the executing, and the other steps described herein may be carried out by an external stream computing environment management module hosted by a remote computing device or server (e.g., server accessible via a subscription, usage-based, or other service model). In this way, aspects of stream computing environment management using a projected database object may be performed using automated computing machinery without manual action. Other methods of performing the steps described herein are also possible.

At block 1410, a set of realized data of a realized database object of the DBMS may be compared with a set of projected data of a projected database object of the DBMS. The comparing may be performed with respect to a database management system that relates to the stream computing environment. Generally, comparing can include contrasting, analyzing, investigating, correlating, juxtaposing, or otherwise evaluating the set of realized data of the realized database object in parallel with the set of projected data of the projected database object of the DBMS. The realized database object may include a data structure within the DBMS that is configured to maintain a set of realized data. As examples, the realized data object may include a set of tables, a set of indices, a set of views, or the like. The set of realized data may include a collection of structured or unstructured information stored within the realized database object. The set of realized data may include data entries, values, parameters, character strings, measurements, or a variety of other types of information stored and maintained by the DBMS. As examples, the set of realized data may include flight reservations, product inventory lists, financial transactions, serial numbers, International Standard Book Number (ISBN) information for library books, or the like. The projected database object may include a data structure that illustrates a representation of a future state of the DBMS after performance of one or more predicted database operations indicated by incoming stream computing data from the stream computing environment. In embodiments, the projected database object may include an entire database, a set of tables, a set of indexes, a set of Maintained Temporary Indexes (MTIs), a set of Materialized Query Tables (MQTs), or other data structures configured to represent the anticipated future state of one or more portions of the DBMS (e.g., the realized computing object) after completion of one or more insert, update, or delete operations. The projected database object may be configured to maintain a set of projected data. The set of projected data may include a collection of data that represents a predicted state of the set of realized data after performance of one or more anticipated database operations (e.g., indicated by incoming stream computing data from the stream computing environment). The set of projected data may include data that does not currently exist in the set of realized data but is expected to be added based on the set of stream computing data (e.g., new data entries or records), data that is updated or changed with respect to the existing set of realized data, or the like. In embodiments, the set of realized data of the realized database object may be compared with the set of projected data of the projected database object. Comparing may include examining the set of realized data and the set of projected data with respect to one another to ascertain aspects that differ between the set of realized data and the set of projected data. For instance, in embodiments, comparing may include searching (e.g., probing, investigating) the set of realized data for data that is maintained in the projected database object but does not exist in the realized database object. In embodiments, comparing may include periodically (e.g., after a threshold number of database operations, after a predetermined period of time) juxtaposing the set of realized data and the set of projected data to evaluate the differences between the set of realized data and the set of projected data. Other methods of comparing the set of realized data of the realized database object of the DBMS with the set of projected data of the projected database object of the DBMS are also possible.

At block 1450, an outlier subset of the set of projected data of the projected database object may be identified. The outlier subset may be identified based on comparing the set of realized data of the realized database object with the set of projected data of the projected database object. Generally, identifying can include sensing, recognizing, ascertaining, detecting, discovering, or otherwise determining the outlier subset of the set of projected data of the projected database object. The outlier subset may include a portion of the set of projected data for which a corresponding portion (e.g., match) does not exist in the set of realized data. In embodiments, the outlier subset may include a portion of the set of projected data that does not achieve a similarity threshold with respect to the set of realized data. In embodiments, the outlier subset may include data that is maintained in the projected database object but has no corresponding match in the set of realized data of the realized data object. As an example, the outlier subset may include a group of records defining anticipated product shipment numbers that are maintained in the set of projected data but are not located in the set of realized data (e.g., have no corresponding match in the set of realized data). In embodiments, identifying the outlier subset may be based on comparing the set of realized data of the realized database object with the set of projected data of the projected database object. For instance, identifying may include comparing each data entry (e.g., record) of the set of projected data with each data entry of the set of realized data, and ascertaining a subset of data entries of the set of projected data for which no corresponding match exists in the set of realized data. Accordingly, the ascertained subset of data entries may be identified as the outlier subset. As an example, consider a set of projected data including a list of forecasted temperature values of "48° C., 51° C., 44° C." for a processor under different workloads. In embodiments, the set of projected data may be compared with a set of realized data specifying forecasted temperature values of "68° C., 74° C., 71° C." for the processor under the same workloads, and it may be ascertained that the forecasted temperature values of the set of projected data fail to achieve a tolerance threshold of "10%." As such, the list of forecasted temperature values of the set of projected data may be identified as the outlier subset (e.g., the temperature values of the set of realized data did not constitute a corresponding match for the set of projected data). Other methods of identifying the outlier subset based on comparing the set of realized data of the realized database object with the set of projected data of the projected database object are also possible.

In embodiments, it may be ascertained that the stream computing environment includes a set of outlier tuples at block 1454. Ascertaining that the stream computing environment includes the set of outlier tuples may be based on the outlier subset. Aspects of the disclosure relate to the recognition that, in some situations, the outlier subset of the set of projected data may correspond to (e.g., be related to, arise from) tuples from the stream computing environment.

Accordingly, in embodiments, aspects of the disclosure relate to ascertaining a subset of outlier tuples based on the outlier subset. Generally, ascertaining can include resolving, detecting, computing, sensing, calculating, recognizing, identifying, or otherwise determining that the stream computing environment includes the set of outlier tuples. The set of outlier tuples may include tuples of the stream computing environment that correspond to, generate, coincide with, or are otherwise related to the outlier subset. For instance, the subset of outlier tuples may include tuples that, when processed by the DBMS, result in creation of the outlier subset in the set of projected data. As an example, the set of outlier tuples may include tuples that result in the creation of data entries in the projected database object which are not represented in the realized database object. As such, in embodiments, ascertaining that the stream computing environment includes the set of outlier tuples may be based on the existence of the outlier subset in the set of projected data (e.g., the presence of the outlier subset indicates the set of outlier tuples). In embodiments, the set of outlier tuples may include tuples that share a trait, property, or characteristic with the outlier subset. For instance, the set of outlier tuples may be tuples that have the same tuple type or one or more of the same tuple attributes as the tuples that led to creation of the outlier subset in the set of projected data. As an example, consider that each data entry of the outlier subset of the set of projected data is associated with an attribute of "Latency: 5 seconds or more" (e.g., data entries for the tuples are created in the set of projected data, but the data entries have too much latency to be represented in the realized database object). Accordingly, ascertaining may include examining the operator graph of the stream computing environment to detect a group of tuples that are associated with a latency value of 5 seconds or more, and identifying the group of tuples as the set of outlier tuples. Other methods of ascertaining that the stream computing environment includes the set of outlier tuples are also possible.

In embodiments, an outlier response operation for execution in the stream computing environment may be determined at block 1458. The outlier response operation may be determined based on the outlier subset of the set of projected data of the projected database object. Generally, determining can include formulating, resolving, detecting, computing, deriving, calculating, recognizing, identifying, or otherwise ascertaining the outlier response operation for execution in the stream computing environment. The outlier response operation may include an action, process, procedure, or other activity configured to modify one or more stream operators, processing elements, tuples, stream computing application code, or other elements of the stream computing environment to positively impact performance and efficiency of the stream computing environment with respect to the DBMS (e.g., reduce data congestion, promote data throughput, facilitate resource usage efficiency). As examples, the outlier response operation may include removing tuples (e.g., the set of outlier tuples) from the stream computing environment, revising the flow path of tuples through the operator graph, or changing one or more stream operators of the stream computing environment. In embodiments, the outlier response operation may be determined based on the outlier subset of the set of projected data. For instance, determining may include analyzing the outlier subset of the set of projected data to identify a trigger parameter that explains why the data entries of the outlier subset were not represented in the realized data object, and subsequently ascertaining an outlier response operation to resolve the trigger parameter. In embodiments, determining may include examining the outlier subset with respect to a set of outlier classification criteria. The set of outlier classification criteria may include thresholds, stipulations, requirements, and other conditions that define reasons that data is classified as an outlier subset (e.g., and thereby not included in the realized database object). As examples, the set of outlier classification criteria may include one or more of a data relevance criterion (e.g., data is not relevant or important to the DBMS), a data corruption criterion (e.g., data is corrupt/unreadable), a data conformity criterion (e.g., data is not structured according to a supported format), a data exception criterion (e.g., data is the target of an exception and cannot be processed), or a data confidence criterion (e.g., data is not trustworthy or accurate enough for inclusion in the DBMS). In embodiments, the set of outlier classification criteria may specify a plurality of parameter ranges, where each parameter range is associated with one or more suggested/recommended outlier response actions. As an example, the set of outlier classification criteria may indicate that tuples corresponding to data that achieves a 90% or greater confidence threshold are established in the realized database object, tuples corresponding to data that achieves a confidence threshold between 80-89% are assigned a lower processing priority, tuples corresponding to data that achieves a confidence threshold between 70-79% are re-routed through an alternate execution path, and tuples corresponding to data that achieves a confidence threshold of 69% or below are filtered from the stream computing environment. Accordingly, a set of data may be compared to the set of outlier classification criteria, and an outlier response operation to positively impact performance of the stream computing environment with respect to the DBMS may be selected. In embodiments, determining may include receiving a user input specifying a requested outlier response action or a requirement that be taken into account by an outlier response action automatically determined by a stream management engine. Other methods of determining the outlier response operation based on the outlier subset of the set of projected data of the projected database object are also possible.

At block 1490, an outlier response operation may be executed in the stream computing environment. The outlier response operation may be executed based on the outlier subset of the set of projected data of the projected database object. Generally, executing can include initiating, carrying-out, instantiating, accomplishing, completing, or otherwise performing the outlier response operation in the stream computing environment. Executing the outlier response operation may include utilizing a streams management engine to implement a specified action or process to modify the stream computing environment. In embodiments, executing can include generating a set of instructions indicating the outlier response operation (e.g., the outlier response operation determined based on the outlier subset), and relaying the set of instructions to the streams management engine to be carried out in the stream computing environment. For instance, in response to determining the outlier response action based on the outlier subset, a streams management command specifying the outlier response action may be generated and inserted into a queue of the streams management engine to be performed in the streams computing environment in a subsequent operational cycle. As an example, in response to determining an outlier response operation of "filter out tuples having a temperature measurement that indicates less than a 5% variation with respect to a current reference temperature value" (e.g., variation is too small to be meaningful/significant), the streams management engine may insert a filter operator in the operator graph of the stream computing environment to filter the tuples as specified by the designated outlier response operation. Other methods of executing the outlier response operation in the stream computing environment are also possible.

Consider the following example. A DBMS may be configured to organize and manage a set of Internet-of-Things (IoT) data streamed to it via a stream computing environment. The set of IoT data may be collected from a plurality of different sensors including a first sensor, a second sensor, and a third sensor. Each sensor may be associated with a confidence score that indicates the degree or extent of accuracy, reliability, trustworthiness, or dependability of the data it collects. For instance, the first sensor may be associated with a confidence score of "62," the second sensor may be associated with a confidence score of "95" and the third sensor may be associated with a confidence score of "55" (e.g., where greater values indicate greater levels of confidence and lesser values indicate lesser levels of confidence). As described herein, the DBMS may include a realized data object to maintain IoT data received from the stream computing environment as well as a projected database object to provide an advance preview of the realized database after receipt of incoming (e.g., anticipated) IoT data. In embodiments, a set of realized data of the realized data object may be compared with the set of projected data of the projected database object to identify an outlier subset of the set of projected data. For instance, in embodiments, it may be determined that an outlier subset including a set of columns storing data received from the third sensor is not represented in the realized database object despite being included in the projected database object. Accordingly, the outlier subset may be examined to ascertain a trigger parameter that explains why the outlier subset is not used by/maintained in the realized database object. In embodiments it may be determined that only data associated with a confidence score of "60" or greater is imported from the projected database object to the realized database object, such that data received from the third sensor is not considered to be trustworthy enough for inclusion in the realized database object (e.g., the confidence score for the third sensor is 55, which does not achieve the threshold confidence score of 60). As such, an outlier response action corresponding to the outlier subset may be determined and executed in the stream computing environment. For instance, in embodiments, an outlier response action to filter out a set of outlier tuples (e.g., corresponding to the outlier subset) from the third sensor may be determined and executed in the stream computing environment by the streams management engine. As another example, an outlier response action to disable (e.g., shut-down) the third sensor may be determined and executed. Other methods of managing a stream computing environment using a projected database object are also possible.

Method 1400 concludes at block 1499. As described herein, aspects of method 1400 relate to managing a stream computing environment using a projected database object. Aspects of method 1400 may provide performance or efficiency benefits related stream computing environment management. For example, stream computing environment elements (e.g., stream operators, tuples, processing elements) may be modified based on the outlier subset of the projected database object to streamline performance of the stream computing environment with respect to the DBMS. Accordingly, data congestion within the stream computing environment may be mitigated, tuple throughput rates may be positively impacted, and computing resources (e.g., processor, memory) for both the DBMS and the stream computing environment may be saved. Aspects may save resources such as bandwidth, processing, or memory. Altogether, leveraging the projected database object of the DBMS with respect to the stream computing environment may be associated with benefits including data throughput performance, reduced data congestion, and resource usage efficiency.

Figure 15:
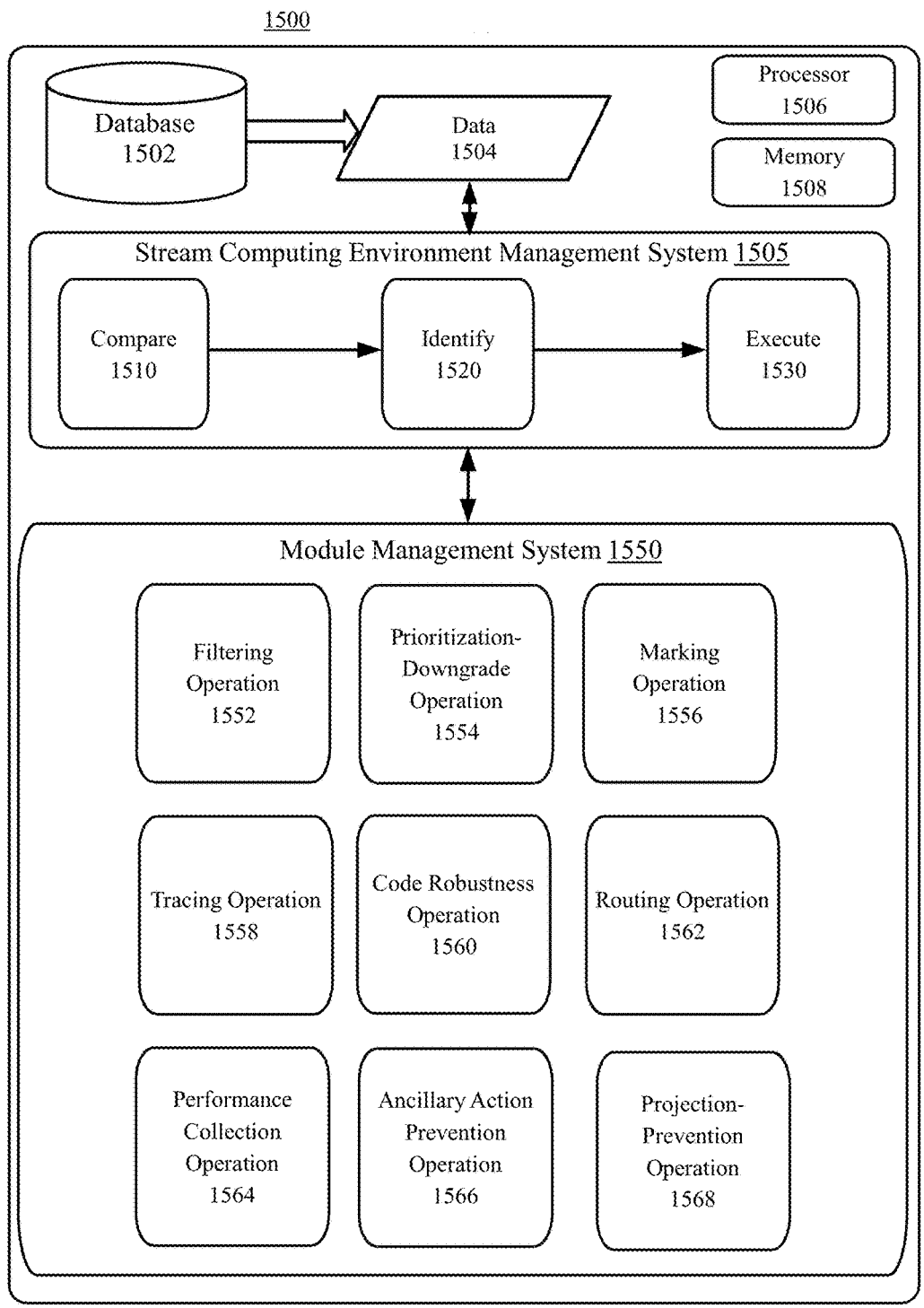
FIG. 15 shows an example system for managing a stream computing environment using a projected database object, according to embodiments.

FIG. 15 shows an example system 1500 for managing a stream computing environment using a projected database object, according to embodiments. The example system 1500 may include a processor 1506 and a memory 1508 to facilitate implementation of a stream computing environment. The example system 1500 may include a database 1502 (e.g., DBMS, realized database object, projected database object). In embodiments, the example system 1500 may include a stream computing environment management system 1505. The stream computing environment management system 1505 may be communicatively connected to the database 1502, and be configured to receive data 1504 related to a stream computing environment. The stream computing environment management system 1505 may include a comparing module 1510 to compare a set of realized data of a realized database object with a set of projected data of a projected database object, an identifying module 1520 to identify an outlier subset of the set of projected data of the projected database object based on comparing the set of realized data with the set of projected data, and an executing module 1530 to execute an outlier response operation in the stream computing environment based on the outlier subset of the set of projected data. The operational steps described herein may be performed dynamically (e.g., in real-time, ongoing, on-the-fly) to streamline stream computing environment management. The stream computing environment management system 1505 may be communicatively connected with a module management system 1550 that includes one or more modules for implementing aspects of stream computing environment management.

In embodiments, a filtering operation may occur at module 1552. In embodiments, the outlier response operation may be structured to include the filtering operation. Generally, structuring can include setting-up, formatting, organizing, arranging, structuring, instructing, or otherwise establishing the outlier response operation to include the filtering operation. In embodiments, structuring the outlier response operation to include the filtering operation may include configuring the outlier response operation to perform the filtering operation (e.g., potentially in addition to other operations). As an example, structuring the outlier response operation may include generating a filtering operation script to be included in an outlier response operation command such that the streams management engine may implement the filtering operation upon execution of the outlier response command. In embodiments, the outlier subset of the set of projected data of the projected database object may be correlated with a set of outlier tuples of the stream computing environment. Generally, correlating can include associating, linking, relating, coordinating, corresponding, or otherwise matching the outlier subset of the set of projected data with the set of outlier tuples of the stream computing environment. In embodiments, correlating can include mapping the outlier subset of the set of projected data with the corresponding set of outlier tuples of the stream computing environment. For instance, correlating may include identifying a set of tuples that share a characteristic with the outlier subset or tuples that resulted/would result in creation of the outlier subset in the projected database object. As an example, for an outlier subset that indicates product serial numbers for products manufactured by ACME Group, correlating may include identifying a set of tuples in the stream computing environment that also indicate product serial numbers for products manufactured by ACME Group. Other methods of correlating the outlier subset of the set of projected data with the set of outlier tuples of the stream computing environment are also possible.

In embodiments, the set of outlier tuples that correlate to the outlier subset of the set of projected data of the projected database object may be filtered in the stream computing environment. Aspects of the disclosure relate to the recognition that, in some embodiments, the set of outlier tuples may result in the creation of an outlier subset in the projected database object that is not used in the realized database object (e.g., the set of outlier tuples indicates unneeded data, untrustworthy data, redundant data). Accordingly, aspects of the disclosure relate to filtering the set of outlier tuples out of the stream computing environment. Generally, filtering can include sorting, removing, categorizing, classifying, separating, grouping, dropping, or otherwise refining the set of outlier tuples that correlate to the outlier subset. In embodiments, filtering can include eliminating (e.g., clearing out, deleting) the set of outlier tuples from the stream computing environment. For instance, filtering may include establishing a stream operator such as a filter operator, sort operator, functor operator, or other stream operator in the operator graph of the stream computing environment that is configured to remove tuples based on the outlier classification criteria. As an example, with reference to the previous example in which an outlier subset of the projected database indicates product serial numbers for products manufactured by ACME Group (e.g., products manufactured by ACME Group are not carried by a particular store, and so the product serial number for ACME Group products are not maintained in the realized database object), filtering may include instructing the streams management engine to place a filter operator in the operator graph to filter out a set of outlier tuples that indicate the product serial numbers for ACME Group products. Accordingly, creation of subsequent outlier subsets in the projected database object may be avoided (e.g., saving system resources such as processor and memory). Other methods of filtering the set of outlier tuples that correlate to the outlier subset of the set of projected data in the stream computing environment are also possible.

In embodiments, a prioritization-downgrade operation may occur at module 1554. In embodiments, the outlier response action may be structured to include the prioritization-downgrade operation. The outlier subset of the set of projected data of the projected database object may be correlated with a set of outlier tuples of the stream computing environment. In embodiments, a priority of the set of outlier tuples that correlates to the outlier subset of the set of projected data of the projected database object may be downgraded in the stream computing environment. Downgrading may include lowering, demoting, devaluing, degrading, decreasing, or otherwise reducing the priority of the set of outlier tuples that correlates to the outlier subset of the set of projected data. The priority of the set of outlier tuples may refer to the relative degree of importance, preference, significance or precedence of the set of outlier tuples with respect to other tuples of the stream computing environment. For instance, tuples associated with higher priority may be associated with expedited processing operations (e.g., advanced queue positions), greater system resources (e.g., more processor and memory resources allocated for use), preferential operational selection (e.g., prioritized tuples may be utilized for stream operations or DBMS operations), or the like. As described herein, aspects of the disclosure relate to downgrading the priority of the set of outlier tuples. Accordingly, in embodiments, the prioritization-downgrade operation may be an action configured to lower the order/sequence with which the set of outlier tuples are processed, decrease the amount of resources allocated for processing of the set of outlier tuples, use the set of outlier tuples for secondary/tertiary operations (e.g., rather than primary operations) or the like. In embodiments, downgrading may include assigning a quantitative priority rank to the set of outlier tuples that is below a threshold. For instance, a set of outlier tuples may be assigned a quantitative priority rank of "3," where tuples associated with higher priority may be associated with quantitative priority ranks of "2" or "1," respectively (e.g., where lower values indicate greater priority). Other methods of downgrading the priority of the set of outlier tuples that correlates to the outlier subset of the set of projected data are also possible.

In embodiments, a marking operation may occur at module 1556. In embodiments, the outlier response operation may be structured to include the marking operation. The outlier subset of the set of projected data of the projected database object may be correlated with a set of outlier tuples of the stream computing environment. In embodiments, the set of outlier tuples that correlates to the outlier subset of the set of projected data of the projected database object may be marked in the stream computing environment. Generally, marking can include tagging, highlighting, designating, indicating, or otherwise identifying the set of outlier tuples that correlates to the outlier subset of the set of projected data. In embodiments, marking may include assigning an outlier flag to the set of outlier tuples to facilitate distinguishing of the set of outlier tuples from other tuples in the stream computing environment. In embodiments, marking may include embedding an outlier flag within a set of metadata for one or more tuples of the set of outlier tuples. For instance, marking may include establishing a sorting operator in the operator graph of the stream computing environment configured to compare a set of tuples flowing through the operator graph with respect to the set of outlier classification criteria, and establishing the outlier flag in a header of each outlier tuple that achieves one or more of the set of outlier classification criteria. As an example, the sorting operator may be configured to mark those tuples that have a confidence level of less than "60%" with an outlier flag. In embodiments, marking the set of outlier tuples may be used to facilitate performance of other outlier response actions (e.g., filtering, tracing, routing). Other methods of marking the set of outlier tuples that correlates to the outlier subset of the set of projected data are also possible.

In embodiments, a tracing operation may occur at module 1558. In embodiments, the outlier response operation may be structured to include the tracing operation. The outlier subset of the set of projected data of the projected database object may be correlated with a set of outlier tuples of the stream computing environment. In embodiments, the set of outlier tuples that correlate to the outlier subset of the set of projected data of the projected database object may be traced in the stream computing environment. Generally, tracing can include tracking, observing, investigating, following, or otherwise monitoring the outlier subset of the set of projected data of the projected database object. In embodiments, tracing may include tracking the route traveled by the set of outlier tuples through the operator graph of the stream computing environment. For instance, tracing may include monitoring the set of outlier tuples to detect the path that each outlier tuple takes between a defined start point (e.g., source operator) and a defined end point (e.g., sink operator). Tracing may include detecting each operator that a particular tuple passes through as it flows through the operator graph, the nature of the operations performed on the tuple by each operator, the time it took for the tuple to travel between two points, the time it took for the tuple to be processed by a particular operator, or other information characterizing the path that one or more tuples of the set of outlier tuples traveled through the operator graph. In embodiments, tracing may include using the streams management engine to track the path of the set of outlier tuples (e.g., those tuples marked by an outlier flag) through the operator graph and record the operators, operations, transit times, and other information for the set of outlier tuples in an outlier tuple path log. In certain embodiments, the tracing operation may be configured to a first operational mode in which tracking of the set of outlier tuples is highly prioritized (e.g., additional resources are devoted to tracking, detailed information for each tuple is tracked) or a second operational mode in which tracking of the set of outlier tuples is not prioritized (e.g., less resources allocated for tuple tracking, less information is monitored for the set of outlier tuples). Other methods of tracing the set of outlier tuples that correlates to the outlier subset of the set of projected data are also possible.

In embodiments, a code robustness operation may occur at module 1560. In embodiments, the outlier response operation may be structured to include the code robustness operation. The outlier subset of the set of projected data of the projected database object may be correlated with a set of outlier tuples of the stream computing environment. In embodiments, a robust nature of a set of code to process the set of outlier tuples may be modified in the stream computing environment. Generally, modifying can include revising, editing, amending, adjusting, altering, or otherwise changing the robust nature of the set of code to process the set of outlier tuples that correlates to the outlier subset of the set of projected data of the projected database object. The set of code may include one or more routines, subroutines, source code elements, or other code modules or components that define stream operations within the stream computing environment. As an example, the set of code may include a code component that defines a "join" operation for performance within the stream computing environment. The robust nature of the set of code may indicate the degree or extent of stability, health, fitness, performance, or dependability of one or more components or modules of the set of code. For instance, code that is more robust may be associated with greater flexibility to handle a range of stream operations, lower error/failure rates, a greater level of comprehensiveness or stringency, or a higher level of performance (e.g., potentially at the cost of more system resources), while code that is less robust may be associated with narrower applications, fragility (e.g., more prone to errors or failures), a lesser level of comprehensiveness or stringency, or a lesser level of performance (e.g., potentially requiring less system resources). In embodiments, modifying may include adjusting (e.g., increasing or decreasing) the degree of robustness of the set of code based on the outlier subset of the set of projected data. For instance, modifying may include changing operational parameters for one or more stream operators, editing code components for one or more stream operators, adding new code, deleting code, replacing code modules, or the like. As an example, consider a situation in which a set of outlier tuples results in the creation of data entries in the projected database object that are not represented in the realized database object. Accordingly, modifying may include increasing the degree of robustness of a set of code corresponding to one or more stream operators by allocating additional resources (e.g., processor, memory) for use by the stream operators (e.g., to increase the performance/processing level of the stream operators and facilitate delivery of the set of tuples to the realized database object). As another example, consider a situation in which a set of outlier tuples is associated with data that is outdated, irrelevant, or less important relative to other tuples. Accordingly, modifying may include decreasing the degree of robustness of a set of code by replacing one or more stream operators in the operator graph with other stream operators that use less system resources (e.g., so that resources are not wasted on processing unimportant tuples). Other methods of modifying the robust nature of the set of code are also possible.

In embodiments, a routing operation may occur at module 1562. In embodiments, the outlier response operation may be structured to include the routing operation. The outlier subset of the set of projected data of the projected database object may be correlated with a set of outlier tuples of the stream computing environment. The set of outlier tuples that correlates to the outlier subset of the set of projected data of the projected database object may be routed to an execution path in the stream computing environment. Generally, routing can include conveying, relaying, transferring, conducting, sending, or otherwise directing the set of outlier tuples to the execution path. The execution path may include a route, course, or branch of the operator graph that guides the set of outlier tuples from between two points of the operator graph. In embodiments, the execution path may differ from an originally intended path for the set of outlier tuples (e.g., alternate path). In embodiments, routing may include utilizing the streams management engine to send the set of outlier tuples down an alternate execution path, defining a new routing operation for an existing stream operator, establishing a new stream operator to route the set of outlier tuples down the alternate execution path, arranging the operator graph to redirect the set of outlier tuples, or the like. As an example, consider a set of tuples that are designated to be routed from a Point A to a Point D via a Point B. Routing may include identifying a subset of the set of tuples marked with an outlier flag (e.g., by a marking operation) or detected by a tracing operation, and re-routing the subset of the set of tuples to the Point D via a Point C. In embodiments, routing the set of outlier tuples to the execution path may facilitate simplicity, tuple throughput rate, and resource usage efficiency of the stream computing environment. Other methods of routing the set of outlier tuples to the execution path are also possible.

In embodiments, a performance collection operation may occur at module 1564. In embodiments, the outlier response operation may be structured to include the performance collection operation. The outlier subset of the set of projected data of the projected database object may be correlated with a set of outlier tuples of the stream computing environment. A set of outlier tuple performance information for the set of outlier tuples may be collected in the stream computing environment. Generally, collecting can include acquiring, gathering, obtaining, assembling, aggregating, or otherwise capturing the set of outlier tuple performance information for the set of outlier tuples. The set of outlier tuple performance information may include a collection of data, measurements, or statistics for the set of outlier tuples that characterize the manner in which the set of outlier tuples are managed or processed by the stream computing environment. As examples, the set of outlier tuple performance information may include metrics that characterize what operators the set of outlier tuples are processed by (e.g, a join operator and a functor operator), the length of time the set of outlier tuples are processed by particular stream operators (e.g., 4 seconds by a sort operator, 8 seconds by a functor operator), the transmit time between two defined points in the operator graph (e.g., 12 seconds), the throughput rate of the set of outlier tuples (e.g., 388 tuples per second), the degree of difficulty of processing the tuples, how the set of outlier tuples respond to different processing operations, the relative degree of importance of the set of outlier tuples, or the like. In embodiments, collecting the performance information for the set of outlier tuples may include utilizing a streams management engine to administer one or more tuple diagnostic operations and record performance metrics for the set of outlier tuples. As an example, the streams management engine may measure the performance of the set of outlier tuples with respect to one or more stream operators, and determine a set of tuple performance information indicating a tuple throughput rate of 462 tuples per second, an average processing time per tuple of 0.4 seconds, a tuple loss rate of 1.3%, and an average memory usage of 4 megabytes for the set of outlier tuples. In certain embodiments, a performance collection operation for the set of outlier tuples may be prevented (e.g., blocked, canceled forbidden). For instance, the streams management engine may be instructed to block attempts by other diagnostic tools or programs to collect the performance information for the set of tuples (e.g., to avoid wasting resources on unimportant tuples). Other methods of performing the performance collection operation with respect to the set of outlier tuples are also possible.

In embodiments, an ancillary action prevention operation may occur at module 1566. In embodiments, the outlier response operation may be structured to include the ancillary action prevention operation. The outlier subset of the set of projected data of the projected database object may be correlated with a set of outlier tuples of the stream computing environment. A set of ancillary actions with respect to the set of outlier tuples may be prevented in the stream computing environment. Generally, preventing can include avoiding, stopping, delaying, forbidding, blocking, prohibiting, restricting, or otherwise limiting performance of the set of ancillary actions with respect to the set of outlier tuples. The set of ancillary actions may include non-essential (e.g., secondary, tertiary) operations performed with respect to the set of outlier tuples of the stream computing environment. As examples, the set of ancillary actions may include data collection operations, tracking operations, monitoring operations, or other overhead or background operations performed with respect to the set of outlier tuples. In embodiments, preventing the set of ancillary actions may modifying a list of stream computing operation permissions to disable performance of the set of ancillary actions with respect to the set of outlier tuples. In embodiments, preventing the set of ancillary actions may include configuring the streams management engine to monitor a task manager for execution of the set of ancillary actions with respect to the set of outlier tuples, and subsequently blocking performance of the set of ancillary actions for the set of outlier tuples. As an example, preventing may include disabling diagnostic operations with respect to a set of outlier tuples that are associated with a 12-digit product serial number (e.g., the realized database object only supports 10-character strings). Other methods of performing the ancillary action prevention operation are also possible.

In embodiments, a projection-prevention operation may occur at module 1568. In embodiments, the outlier response operation may be structured to include the projection-prevention operation. The outlier subset of the set of projected data of the projected database object may be correlated with a set of outlier tuples of the stream computing environment. A projection of the set of outlier tuples that correlates to the outlier subset may be prevented with respect to the DBMS. Generally, preventing can include avoiding, stopping, delaying, forbidding, blocking, prohibiting, restricting, or otherwise limiting projection of the set of outlier tuples with respect to the DBMS. Aspects of the disclosure relate to the recognition that, in some situations, data entries maintained in the projected database object may not be established in the realized database object (e.g., they are not considered to be important or relevant, correspond to an unsupported format, are corrupt, were changed in transit). Accordingly, aspects of the disclosure relate to preventing projection of the set of outlier tuples in the projected database object (e.g., to facilitate clean-up and organization of the projected database object). In embodiments, preventing projection of the set of outlier tuples may include identifying a group of tuples associated with an outlier flag (e.g., established during a marking operation) and blocking the identified group of tuples from being displayed in the projected database object. In embodiments, preventing may include configuring a projection operator of the stream computing environment to ignore, disregard, or discard the set of outlier tuples so they are not projected in the projected database object. Preventing projection of the set of outlier tuples may be associated with projected database accuracy, clean-up expediency, and DBMS resource usage efficiency. Other methods of preventing projection of the set of outlier tuples are also possible.

Figure 16:
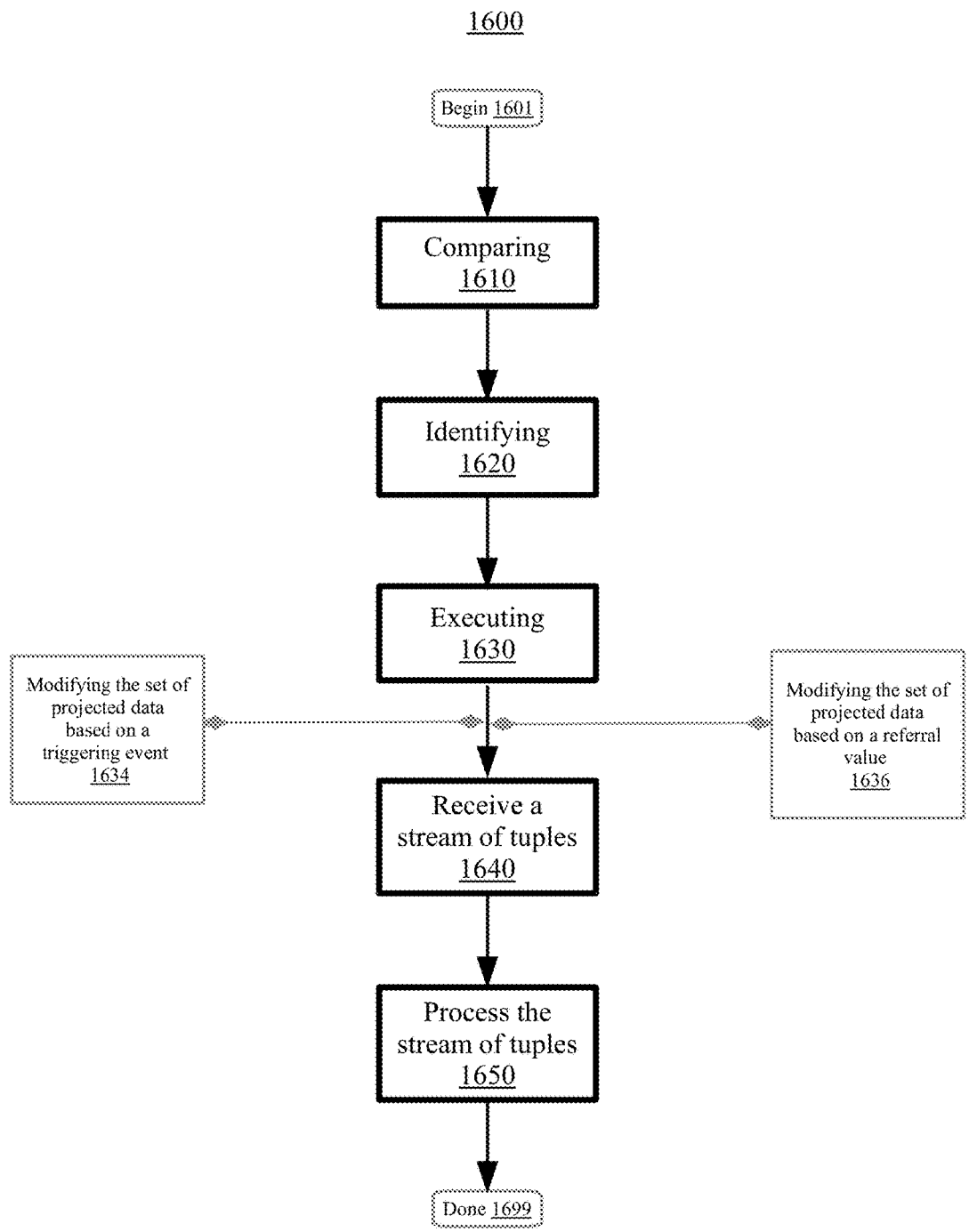
FIG. 16 is a flowchart illustrating a method for managing a stream computing environment using a projected database object, according to embodiments.

FIG. 16 is a flowchart illustrating a method 1600 for managing a stream computing environment using a projected database object, according to embodiments. The method 1600 may begin at block 1601. At block 1610, a set of realized data of a realized database object of the DBMS may be compared with a set of projected data of a projected database object of the DBMS. At block 1620, an outlier subset of the set of projected data of the projected database object may be identified based on comparing the set of realized data of the realized database object with the set of projected data of the projected database object. At block 1630, an outlier response action may be executed in the stream computing environment based on the outlier subset of the set of projected data of the projected database object.

In embodiments, the set of projected data of the projected database object may be modified based on a triggering event at block 1634. Aspects of the disclosure relate to the recognition that, in some situations, it may be desirable to clean-up the projected database object to maintain correspondence with the realized database object. In embodiments, a triggering event may be detected. Generally, detecting can include sensing, recognizing, discovering, identifying, or otherwise ascertaining the triggering event. The triggering event may include a parameter, stipulation, or condition that, once achieved, causes modification of the set of projected data of the projected database object. As examples, the triggering event may include elapsing of a temporal period (e.g., 1 hour, 6 hours, 24 hours), a designated point in time (e.g., every day at 12:00 AM, each day at 8 AM and 8 PM), a threshold number of processed tuples (e.g., 500 tuples, 1000 tuples), a threshold number of entries recorded in the projected database (e.g., 5,000 database entries), a computing resource availability level above a threshold (e.g., 4000 megabytes of ram available, processor usage below 40%), a tuple throughput rate above a threshold (e.g., 1100 tuples per second), or the like. In embodiments, detecting the triggering event may include configuring the streams management engine to monitor the streams computing environment and a DBMS management module to module the DBMS to ascertain when one or more of the thresholds, conditions, or criteria for a triggering event has been achieved.

In embodiments, the set of projected data of the projected database object may be modified to match the set of realized data of the realized database object. The set of projected data may be modified in response to detecting the triggering event. Generally, modifying can include revising, editing, amending, adjusting, altering, or otherwise changing the set of projected data of the projected database object to match (e.g., harmonize with) the set of realized data. In embodiments, modifying the set of projected data to match the set of realized data may include performing a clean-up operation to remove one or more data entries or records from the set of projected data. For instance, in response to detecting that a triggering event of a temporal threshold (e.g., 12 hours) has elapsed, the projected database object and the realized database object may be compared to ascertain a set of data entries that exist in the projected database object that do not exist in the realized database object. Accordingly, the ascertained set of data entries may be deleted from the projected database object to perform the clean-up operation. In embodiments, modifying the set of projected data to match the set of realized data may include replacing the projected database object with the realized database object in response to detecting achievement of the triggering event. As an example, in response to detecting that a triggering event of a computing resource availability level has been achieved (e.g., the DBMS has extra resources that may be used to clean-up the projected database object), the DBMS management module may be configured to delete the projected database object (e.g., from a memory address or storage device partition) and import the realized database object to establish an updated projected database object. Other methods of modifying the set of projected data of the projected database object to match the set of realized data of the realized database object are also possible.

In embodiments, the set of projected data of the projected database object may be modified based on a referral value at block 1636. In embodiments, a referral value which indicates references to a set of columns of the DBMS may be captured. Generally, capturing can include gathering, detecting, accumulating, capturing, sensing, aggregating, or otherwise acquiring or obtaining the referral value. The referral value may include an integer, count, measurement, or other quantitative indication of the extent to which a set of columns of the DBMS (e.g., either the projected database object or the realized database object) are used (e.g., referenced by a database operation). For instance, the referral value may be expressed as a frequency value such as "12 uses per minute" or as a percentage value indicating the relative number of times a particular set of columns is used in relation to other columns of the projected database (e.g., 36%). In embodiments, the referral value may include a ratio of the usage of the set of columns in the projected database object with respect to a corresponding set of columns of the realized database object (e.g., a set of columns of the projected database object is used in 60% of all DBMS operations but is only used in 15% of all DBMS operations in the realized database object). In embodiments, capturing the referral value may include using the DBMS management module to monitor access requests with respect to the set of projected data and record the number of times each column of the projected database is the target of a read or write operation. As an example, the DBMS management module may monitor the projected database object and determine that a first subset of the set of columns has a referral value of "41 uses per minute," a second subset of the set of columns has a referral value of "63 uses per minute," and a third subset of the set of columns has a referral value of "22 uses per minute." Other methods of capturing the referral value which indicates references to the set of columns of the DBMS are also possible.

In embodiments, the referral value may be compared with a threshold value related to references. Generally, comparing can include contrasting, analyzing, investigating, correlating, juxtaposing, or otherwise evaluating the referral value in parallel with the threshold value related to references. The threshold value related to references may include a benchmark, criterion, or normative value that defines a boundary with respect to the number of references (e.g., uses) for the set of columns (e.g., for either the projected database object or the realized database object). As described herein, the threshold value may be expressed as an integer (e.g., total count of 10,000 references), a frequency (e.g., 50 references per minute), or a percentage/proportion (e.g., 30% of references). In embodiments, comparing may include examining the referral value with respect to the threshold value related to references. As an example, a referral value of "111 uses per minute" for the set of columns may be compared with a threshold value of "100 uses per minute." In embodiments, it may be computed that the referral value exceeds the threshold value related to references. Generally, computing can include formulating, resolving, identifying, ascertaining, estimating, determining, or otherwise calculating that the referral value exceeds the threshold value related to references. In embodiments computing may include ascertaining a relationship between the magnitude of the referral value relative to the threshold value. For instance, with reference to the previous example, in response to comparing the referral value of 111 uses per minute and the threshold value of 100 uses per minute, it may be determined that the referral value exceeds the threshold value (e.g., 111 is greater than 100). Other methods of comparing the referral value with the threshold value and computing that the referral value exceeds the threshold value related to references are also possible.

In embodiments, the set of projected data of the projected database object may be modified to harmonize with the set of realized data of the realized database object. The set of projected data may be modified based on and in response to computing that the referral value exceeds the threshold value related to references. Generally, modifying can include revising, editing, amending, adjusting, altering, or otherwise changing the set of projected data of the projected database object to harmonize with (e.g., match) the set of realized data. In embodiments, modifying the set of projected data to match the set of realized data may include editing one or more tables, rows, columns, cells, indices or other data structures of either the projected database object or the realized database object to align them with one another. As an example, in response to computing that a referral value for the set of columns of the realized database object exceeds the threshold value related to references of the projected database object, the set of columns of the projected database object may be revised to align with a corresponding set of columns of the realized database object. As an example, consider a situation in which a first set of columns of the realized database object is associated with a referral value of "73%" and a corresponding second set of columns of the projected database object is associated with a threshold value of "35%." Accordingly, in embodiments, the second set of columns of the projected database object may be configured to import the set of realized data from the first set of columns of the realized database object (e.g., to align the projected database with respect to the realized database). As described herein, in certain embodiments, modifying the set of projected data to match the set of realized data may include performing a clean-up operation to remove one or more data records from the set of projected data, or replacing the projected database object with the realized database object. Other methods of modifying the projected database object to harmonize with the set of realized data of the realized database object are also possible.

At block 1640, a stream of tuples may be received. The stream of tuples may be processed by a plurality of processing elements (e.g., stream operators) operating on a set of compute nodes (e.g., shared pool of configurable computing resources, in a stream application environment). The stream of tuples may be received consistent with the description herein including FIGS. 1-16. Current/future processing by the plurality of processing elements may be performed consistent with the description herein including FIGS. 1-16. The set of compute nodes may include a shared pool of configurable computing resources. For example, the set of compute nodes can include a public cloud environment, a private cloud environment, or a hybrid cloud environment. In certain embodiments, each of the set of compute nodes may be physically separate from one another.

At block 1650, the stream of tuples may be processed. The processing may occur using the set of processing elements operating on the set of compute nodes. The stream of tuples may be processed consistent with the description herein including FIGS. 1-16. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators. Method 1600 concludes at block 1699. Aspects of method 1600 may provide performance or efficiency benefits related to managing a stream computing environment using a projected database object. Aspects may save resources such as bandwidth, processing, or memory.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for managing a stream computing environment using a projected database object, the method comprising:
    comparing, with respect to a database management system (DBMS) that relates to the stream computing environment, a set of realized data of a realized database object of the DBMS with a set of projected data of a projected database object of the DBMS;
    identifying, based on comparing the set of realized data of the realized database object with the set of projected data of the projected database object, an outlier subset of the set of projected data of the projected database object;
    structuring, based on the outlier subset of the set of projected data of the projected database object, an outlier response operation for execution in the stream computing environment;
    executing, based on the outlier subset of the set of projected data of the projected database object, the outlier response operation in the stream computing environment which corresponds to the outlier subset of the set of projected data of the projected database object;
    detecting a triggering event; and
    modifying, in response to detecting the triggering event, the set of projected data of the projected database object to match the set of realized data of the realized database object.

2. The method of claim 1, further comprising:
    ascertaining, based on the outlier subset of the set of projected data of the projected database object, that the stream computing environment includes a set of outlier tuples.

3. The method of claim 1, further comprising:
    structuring the outlier response operation to include a filtering operation;
    correlating the outlier subset of the set of projected data of the projected database object with a set of outlier tuples of the stream computing environment; and
    filtering, in the stream computing environment, the set of outlier tuples that correlates to the outlier subset of the set of projected data of the projected database object.

4. The method of claim 1, further comprising:
    structuring the outlier response operation to include a prioritization-downgrade operation;
    correlating the outlier subset of the set of projected data of the projected database object with a set of outlier tuples of the stream computing environment; and
    downgrading, in the stream computing environment, a priority of the set of outlier tuples that correlates to the outlier subset of the set of projected data of the projected database object.

5. The method of claim 1, further comprising:
    structuring the outlier response operation to include a marking operation;
    correlating the outlier subset of the set of projected data of the projected database object with a set of outlier tuples of the stream computing environment; and
    marking, in the stream computing environment, the set of outlier tuples that correlates to the outlier subset of the set of projected data of the projected database object.

6. The method of claim 1, further comprising:
    structuring the outlier response operation to include a tracing operation;
    correlating the outlier subset of the set of projected data of the projected database object with a set of outlier tuples of the stream computing environment; and
    tracing, in the stream computing environment, the set of outlier tuples that correlates to the outlier subset of the set of projected data of the projected database object.

7. The method of claim 1, further comprising:
    structuring the outlier response operation to include a code robustness operation;
    correlating the outlier subset of the set of projected data of the projected database object with a set of outlier tuples of the stream computing environment; and
    modifying, in the stream computing environment, a robust nature of a set of code to process the set of outlier tuples that correlates to the outlier subset of the set of projected data of the projected database object.

8. The method of claim 1, further comprising:
    structuring the outlier response operation to include a routing operation;
    correlating the outlier subset of the set of projected data of the projected database object with a set of outlier tuples of the stream computing environment; and
    routing, to an execution path in the stream computing environment, the set of outlier tuples that correlates to the outlier subset of the set of projected data of the projected database object.

9. The method of claim 1, further comprising:
    structuring the outlier response operation to include a performance collection operation;
    correlating the outlier subset of the set of projected data of the projected database object with a set of outlier tuples of the stream computing environment; and
    collecting, in the stream computing environment, a set of outlier tuple performance information for the set of outlier tuples that correlates to the outlier subset of the set of projected data of the projected database object.

10. The method of claim 1, further comprising:
    structuring the outlier response operation to include an ancillary action prevention operation;
    correlating the outlier subset of the set of projected data of the projected database object with a set of outlier tuples of the stream computing environment; and preventing, in the stream computing environment, a set of ancillary actions with respect to the set of outlier tuples that correlates to the outlier subset of the set of projected data of the projected database object.

11. The method of claim 1, further comprising:
structuring the outlier response operation to include a projection-prevention operation;
correlating the outlier subset of the set of projected data of the projected database object with a set of outlier tuples of the stream computing environment; and
preventing, with respect to the DBMS, a projection of the set of outlier tuples that correlates to the outlier subset of the set of projected data of the projected database object.

12. The method of claim 1, further comprising:
capturing a referral value which indicates references to a set of columns of the DBMS;
comparing the referral value with a threshold value related to references;
computing that the referral value exceeds the threshold value related to references; and
modifying, based on and in response to computing that the referral value exceeds the threshold value related to references, the set of projected data of the projected database object to harmonize with the set of realized data of the realized database object.

13. The method of claim 1, further comprising:
evaluating, to identify the outlier subset of the set of projected data of the projected database object, the set of projected data of the projected database object with respect to a set of outlier classification criteria selected from the group consisting of:
a data relevance criterion;
a data corruption criterion;
a data conformity criterion;
a data exception criterion; and
a data confidence criterion.

14. The method of claim 1, further comprising:
performing, in a dynamic fashion to streamline management of the stream computing environment using the projected database object, each of:
the comparing, the identifying, and the executing.

15. The method of claim 1, further comprising:
executing, in an automated fashion without user intervention, each of:
the comparing, the identifying, and the executing.

16. The method of claim 1, further comprising:
receiving a stream of tuples to be processed by a set of processing elements which operates on a set of compute nodes; and
processing, using the set of processing elements operating on the set of compute nodes, the stream of tuples.

17. A system for managing a stream computing environment using a projected database object, the system comprising:
a memory having a set of computer readable computer instructions, and
a processor for executing the set of computer readable instructions, the set of computer readable instructions including:
comparing, with respect to a database management system (DBMS) that relates to the stream computing environment, a set of realized data of a realized database object of the DBMS with a set of projected data of a projected database object of the DBMS;
identifying, based on comparing the set of realized data of the realized database object with the set of projected data of the projected database object, an outlier subset of the set of projected data of the projected database object;
structuring, based on the outlier subset of the set of projected data of the projected database object, an outlier response operation for execution in the stream computing environment;
executing, based on the outlier subset of the set of projected data of the projected database object, the outlier response operation in the stream computing environment which corresponds to the outlier subset of the set of projected data of the projected database object;
detecting a triggering event; and
modifying, in response to detecting the triggering event, the set of projected data of the projected database object to match the set of realized data of the realized database object.

18. A computer program product for managing a stream computing environment using a projected database object, the computer program product comprising a computer readable storage medium having program instructions embodied therewith, wherein the computer readable storage medium is not a transitory signal per se, the program instructions executable by a processor to cause the processor to perform a method comprising:
comparing, with respect to a database management system (DBMS) that relates to the stream computing environment, a set of realized data of a realized database object of the DBMS with a set of projected data of a projected database object of the DBMS;
identifying, based on comparing the set of realized data of the realized database object with the set of projected data of the projected database object, an outlier subset of the set of projected data of the projected database object;
structuring, based on the outlier subset of the set of projected data of the projected database object, an outlier response operation for execution in the stream computing environment;
executing, based on the outlier subset of the set of projected data of the projected database object, the outlier response operation in the stream computing environment which corresponds to the outlier subset of the set of projected data of the projected database object;
detecting a triggering event; and
modifying, in response to detecting the triggering event, the set of projected data of the projected database object to match the set of realized data of the realized database object.

* * * * *